United States Patent
Itani

(10) Patent No.: US 8,352,867 B2
(45) Date of Patent: Jan. 8, 2013

(54) PREDICTIVE MONITORING DASHBOARD

(75) Inventor: Ibrahim M. Itani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 975 days.

(21) Appl. No.: 11/959,110

(22) Filed: Dec. 18, 2007

(65) Prior Publication Data

US 2009/0158189 A1 Jun. 18, 2009

(51) Int. Cl.
*G06F 15/177* (2006.01)
*G06F 15/16* (2006.01)
(52) U.S. Cl. .................................. 715/736; 709/224
(58) Field of Classification Search .................. 715/736, 715/734, 733, 772; 709/224
See application file for complete search history.

(56) References Cited

U.S. PATENT DOCUMENTS

| | | | |
|---|---|---|---|
| 7,457,866 B1* | 11/2008 | Hackworth et al. | 709/224 |
| 7,600,160 B1* | 10/2009 | Lovy et al. | 714/57 |
| 2002/0054169 A1* | 5/2002 | Richardson | 345/854 |
| 2002/0133584 A1* | 9/2002 | Greuel et al. | 709/224 |
| 2003/0204588 A1* | 10/2003 | Peebles et al. | 709/224 |
| 2006/0047809 A1* | 3/2006 | Slattery et al. | 709/224 |
| 2008/0155327 A1* | 6/2008 | Black et al. | 714/27 |

* cited by examiner

*Primary Examiner* — Rashawn Tillery

(57) ABSTRACT

A device receives information associated with a job implemented in a network, calculates a statistic based on the information associated with the job, calculates a score for the statistic, calculates health check information based on the information associated with the job, receives information associated with an executing job, and provides for display the calculated statistic, the statistic score, the calculated health check information, and a snapshot of the information associated with the executing job.

27 Claims, 20 Drawing Sheets

FIG. 5

| TABLE | COLUMN | JOB | DRIVE SPACE | APPLIC. | WEB SERVICE | SERVICE LOG | EVENT LOG |
|---|---|---|---|---|---|---|---|
| COUNT | MAX | NAME | NAME | NAME | TIME | HITS | REBOOTED |
| SUM | MIN | STATUS | SPACE | STATUS | ACTIVE | PAGES | DURATION |
| MEAN | STD. DEV. | DURATION | STATUS | SIZE | SERVED | B/WIDTH | OTHER |

PREDICTIVE MONITORING DASHBOARD

BACKGROUND

Daily monitoring and maintenance of one or more networks, devices (e.g., servers, clients, routers, cluster nodes, drives, circuits, etc.) associated with the networks, and applications executing on the network devices are challenging tasks. For example, health checks may be regularly performed to ensure availability of network databases (e.g., by checking that cluster services are started and executing), to check that cluster nodes, and drives are configured and available, etc. Proactive maintenance of storage for network devices may be conducted by cleaning up old backup files, shrinking databases, providing backup plans for databases, providing regular backups of databases on a periodic basis, etc.

Monitoring and maintenance challenges may be further complicated if users (e.g., network administrators, network engineers, network technicians, etc.) responsible for maintaining the one or more networks are in different locations. For example, hardware issues or outages may occur at a location closer to an off-duty user (e.g., during off hours), but may be discovered by an on-duty user (e.g., during working hours) at another location. The on-duty user may need to wait for the off-duty user to resume work before the hardware issues or outages may be resolved.

Jobs may be generated (e.g., by a job or issue tracking system) to address issues in the one or more networks. However, not all users responsible for maintaining the one or more networks have access to view jobs or statuses of jobs. Such users may view the statuses of jobs by accessing logs or log files (e.g., files that list actions, such as requests made to a server, that have occurred in the one or more networks). Immediate and quick actions need to be taken on any abnormalities in jobs, and accessing logs is too time consuming and inefficient for such quick reactions. Furthermore, accessing logs does not permit such users to detect all job failures and data inconsistencies.

BRIEF DESCRIPTION OF THE DRAWINGS

FIG. 5 illustrates a portion of a scoring database of the dashboard server illustrated in FIG. 4;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that provide a predictive monitoring dashboard application for automatically managing, monitoring, maintaining, displaying, providing statistics related to, etc. jobs (e.g., actions addressing one or more hardware, software, hardware and software, networking, etc. issues affecting one or more networks, network devices, applications executing on the network devices, etc.), one or more networks, network devices, applications executing on the network devices etc. For example, in one implementation, the dashboard application may receive information associated with the one or more jobs, may calculate statistics based on the job(s) information, may calculate a score of each statistic, and may provide the statistics and the calculated scores for display. The dashboard application may calculate health check information based on the job(s) information, and may provide the health check information for display. Statuses of executing jobs may be received by the dashboard application, and the dashboard application may provide a snapshot of information associated with the executing jobs for display.

Figure 1:
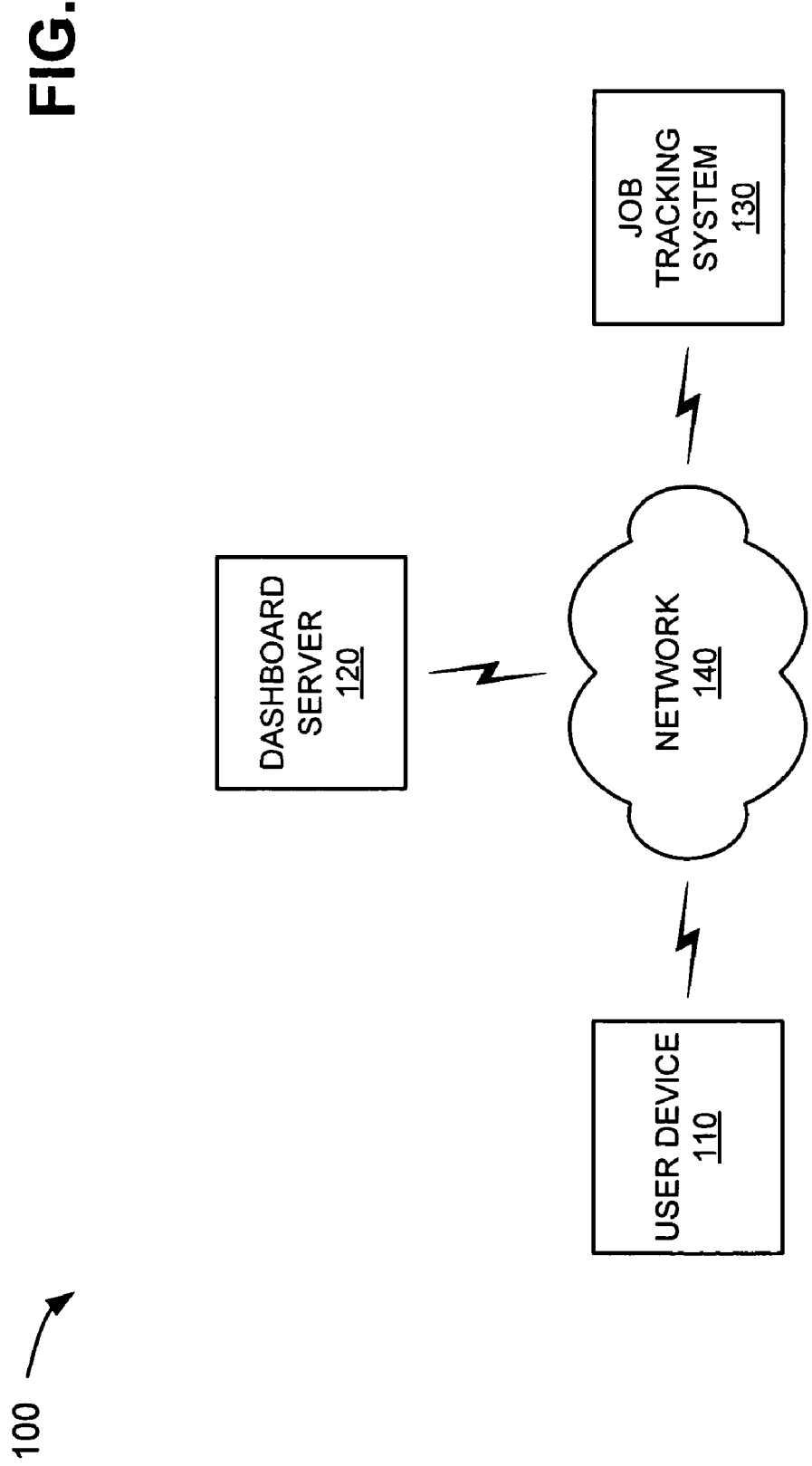
FIG. 1 is an exemplary diagram of a network in which systems and methods described herein may be implemented.

FIG. 1 is an exemplary diagram of a network 100 in which systems and methods described herein may be implemented. As illustrated, network 100 may include a user device 110, a dashboard server 120, and/or a job tracking system 130 interconnected by a network 140. User device 110, dashboard server 120, and/or job tracking system 130 may connect to network 140 via wired and/or wireless connections. A single user device, dashboard server, job tracking system, and network have been illustrated in FIG. 1 for simplicity. In practice, there may be more or less user devices, dashboard servers, job tracking systems, and/or networks. Also, in some instances, one or more of user device 110, dashboard server 120, and/or job tracking system 130 may perform one or more functions described as being performed by another one or more of user device 110, dashboard server 120, and/or job tracking system 130.

User device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, or other types of computation or communication devices, threads or processes running on these devices, and/or objects executable by these devices. In one implementation, user device 110 may include any device that is capable of accessing a software application or a web-based application (e.g., provided by dashboard server 120) that enables a user (e.g., a network administrator, a network engineer, a network technician, etc.) of user device 110 to manage, monitor, maintain, display, provide statistics related to, etc. jobs associated with any of the components of a network (e.g., network 100 or a network separate from network 100).

Dashboard server 120 may include one or more server entities, or other types of computation or communication devices, that gather, process, search, and/or provide information in a manner described herein. In one implementation, dashboard server 120 may provide a software application or a web-based application (e.g., a dashboard application) that manages jobs associated with one or more networks (e.g., network 100 or a network(s) separate from network 100), monitors the jobs, maintains the one or more networks, displays information associated with the jobs (e.g., health reports, dashboard reports, snapshot reports, etc.), calculates statistics (e.g., scores) related to the jobs, etc.

In one example, dashboard server 120 may receive (e.g., from user device 110, job tracking system 130, network 140, other networks and/or devices not shown in FIG. 1, etc.) information associated with one or more jobs (e.g., generated by job tracking system 130 to address issues occurring in one or more networks), and may calculate statistics based on the job(s) information. Dashboard server 120 may calculate a score of each statistic, and may provide for display (e.g., to user device 110) the statistics and the calculated scores. Dashboard server 120 may calculate health check information based on the job(s) information, and may provide for display (e.g., to user device 110) the health check information. Statuses of executing jobs may be received by dashboard server 120, and dashboard server 120 may provide for display (e.g., to user device 110) a snapshot of information associated with the executing jobs. Further details of dashboard server 120 are provided below in connection with FIGS. 4-13.

Job tracking system 130 may include one or more server entities, or other types of computation or communication devices, that gather, process, search, and/or provide information in a manner described herein. In one implementation, job tracking system 130 may include one or more devices that may receive hardware, software, hardware and software, networking, etc. issues affecting one or more networks, network devices, applications executing on the network devices, etc., and may generate one or more jobs to address the issues. In one example, portions of a network may require maintenance (e.g., a circuit may generate an alarm indicating a problem), and jobs may be generated, by job tracking system 130, to address any alarms and/or maintenance events (e.g., a job may request that a network administrator investigate an alarm generated by a circuit).

Network 140 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

Figure 2:
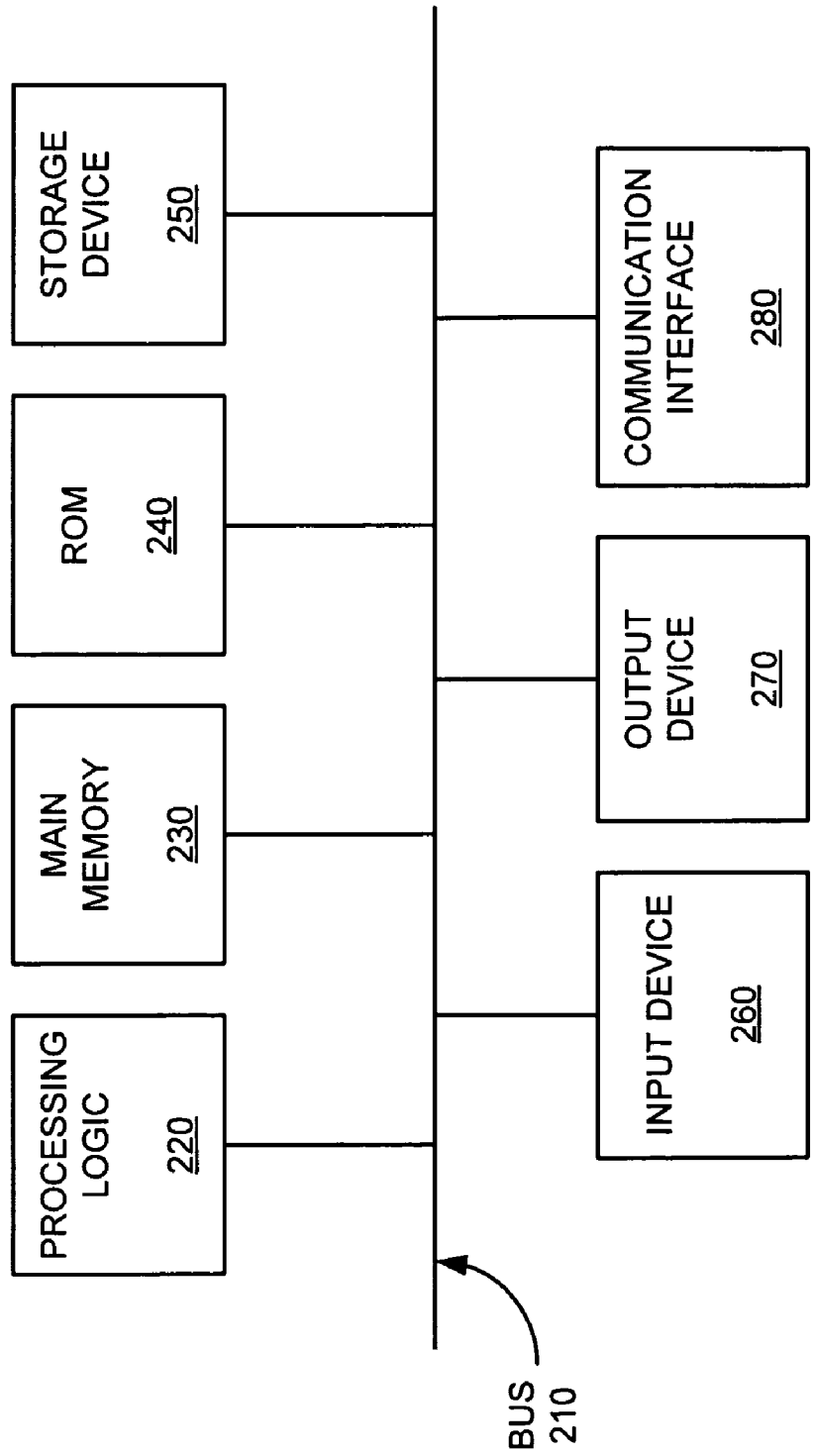
FIG. 2 illustrates exemplary components of a user device, a dashboard server, and/or a job tracking system of the network depicted in FIG. 1.

FIG. 2 is an exemplary diagram of a device 200 that may correspond to user device 110, dashboard server 120, and/or job tracking system 130. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
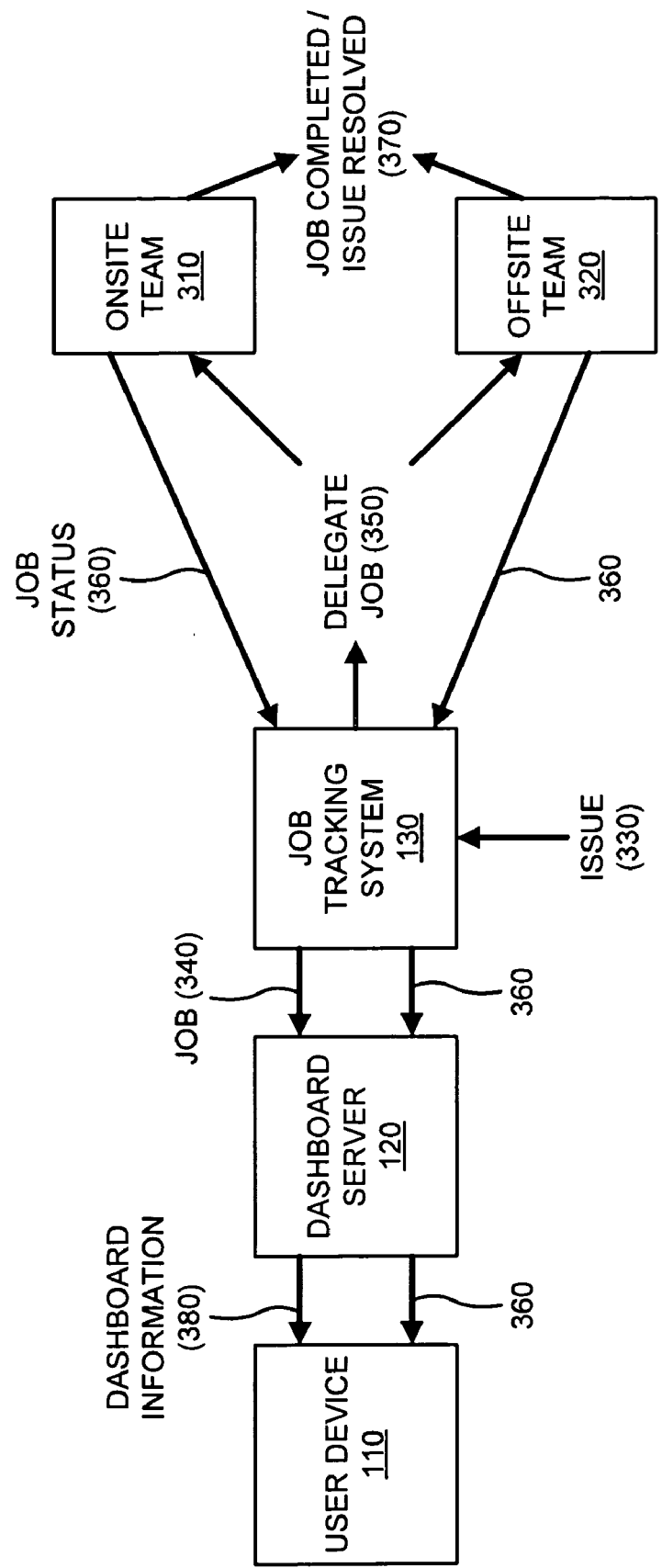
FIG. 3 depicts exemplary interactions between the user device, the dashboard server, and the job tracking system of the network illustrated in FIG. 1.

FIG. 3 depicts a portion 300 of network 100 (that includes user device 110, dashboard server 120, and job tracking system 130), and exemplary interactions between user device 110, dashboard server 120, and job tracking system 130. As illustrated, job tracking system 130 may communicate with an onsite team 310 and/or an offsite team 320. Onsite team 310 may include one or more users (e.g., network administrators, network engineers, network technicians, etc.), one or more devices (e.g., user devices 110, servers, etc.), etc. located closest to a location of an issue 330. Offsite team 320 may include one or more users (e.g., network administrators, network engineers, network technicians, etc.), one or more devices (e.g., user devices 110, servers, etc.), etc. located further away from the location of issue 330 than onsite team 310. Issue 330 may include any issue (e.g., software error and/or malfunction, device error and/or malfunction, network error and/or malfunction, etc.) affecting one or more networks (e.g., network 140, a network separate from network 140, etc.), network devices, applications executing on the network devices, etc.

As further shown in FIG. 3, issue 330 may be received by job tracking system 130, and job tracking system 130 may generate a job 340 based on issue 330 and/or information associated with issue 340. Job 340 may include a mechanism (e.g., a trouble ticket or trouble report) that may be used to track detection, reporting, and resolution of some type of problem (e.g., an outage in the customer's network) on which issue 330 is based. For example, job 340 may define a problem and may help to coordinate with people (e.g., network administrators) who may work on the problem. In another example, as job 340 moves though a system (e.g., via dashboard server 120 and/or job tracking system 130), it may be classified as a certain type of problem, which in turn may determine an expertise level of people assigned to address job 340. If job 340 is not completed or resolved, an "open ticket" for job 340 may remain in a work queue. If job 340 is resolved, a ticket may be "closed."

Returning to FIG. 3, job 340 may be received by dashboard server 120, and job tracking system 130 may delegate job 340, as indicated by reference number 350, to onsite team 310 and/or offsite team 320 for resolution. Onsite team 310 and/or offsite team 320 may investigate issue 330 associated with job 340, may send job status information 360 (e.g., corrective measures being taken, duration of job 340, users handling job 340, etc.), and may attempt to resolve issue 330 (i.e., complete job 340), as indicated by reference number 370.

As further shown in FIG. 3, job status information 360 may be received by job tracking system 130, and may be provided by job tracking system 130 to dashboard server 120. Dashboard server 120 may forward job status information 360 and dashboard information 380 to user device 110 for display to a user. Dashboard server 120 may use information associated with issue 330, information associated with job 340, job status information 360, etc. to calculate and generate dashboard information 380. Dashboard information 380 may include information associated with job 340 (e.g., health reports, dashboard reports, snapshot reports, etc.), statistics (e.g., scores) related to job 340, etc., as described below in connection with FIG. 4.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
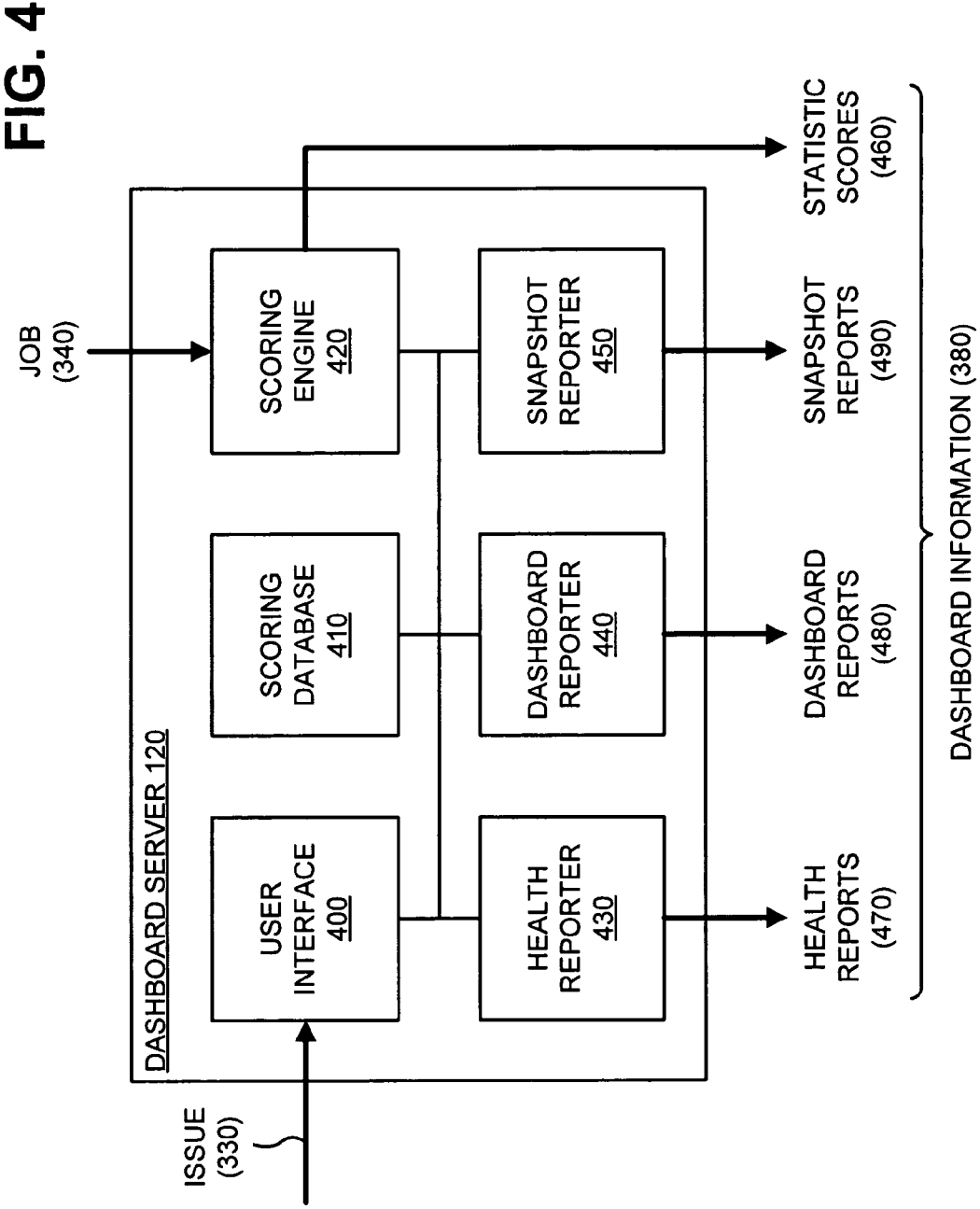
FIG. 4 depicts exemplary components of the dashboard server of the network illustrated in FIG. 1.

FIG. 4 depicts exemplary components of dashboard server 120. As illustrated, dashboard server 120 may include a user interface 400, a scoring database 410, a scoring engine 420, a health reporter 430, a dashboard reporter 440, and a snapshot reporter 450.

User interface 400 may include a graphical user interface (GUI) or a non-graphical user interface, such as a text-based interface. User interface 400 may provide information to users (e.g., network administrators) via a customized interface (e.g., a proprietary interface) and/or other types of interfaces (e.g., a browser-based interface). User interface 400 may receive user inputs via one or more input devices (e.g., input device 260), may be user configurable (e.g., a user may change the size of user interface 400, information displayed in user interface 400, color schemes used by user interface 400, positions of text, images, icons, windows, etc., in user interface 400, etc.), and/or may not be user configurable. User interface 400 may be displayed to a user via one or more output devices (e.g., output device 270).

Scoring database 410 may be provided in dashboard server 120 (e.g., within storage device 250) and/or may be managed by dashboard server 120 (e.g., in which case, scoring database 410 may be located external to dashboard server 120). Scoring database 410 may include a variety of information related to issues (e.g., issue 330) and/or jobs (e.g., job 340) being managed, monitored, maintained, etc. by dashboard server 120. For example, scoring database 410 may include statistical information, such as table statistics, column statistics, job statistics, drive space statistics, application status, web service statistics, web service log statistics, event log statistics, etc. associated with networks, network devices, applications executing on the network devices, etc. In one implementation, the information contained in scoring database 410 may be calculated by dashboard server 120 based on information associated with one or more jobs. Further details of scoring database 410 are provided below in connection with FIG. 5.

In one implementation, user interface 400 may receive selection (e.g., from a network administrator via user device 110) of a job, and processing logic (e.g., processing logic 220) may query scoring database 410 to determine hardware and/or software that may be associated with the selected job (e.g., a job may be executing on a particular server and may be executing a particular application), to determine status information (e.g., statistical information) of the associated hardware and/or software, etc.

Scoring engine 420 may include any hardware and/or software based logic (e.g., processing logic 220) that enables dashboard server 120 to provide a measure (e.g., a score) for each statistic contained in scoring database 410. Scoring engine 420 may output statistic scores 460 (e.g., to user device 110) as described below. In one implementation, scoring engine 420 may determine a score of a current statistic (e.g., a current table statistic, column statistic, job statistic, drive space statistic, application statistic, web service statistic, web service log statistic, event log statistic, etc.) against other statistics contained in scoring database 410 based on a difference between an expected result and an actual result. For example, a score for the current statistic may be calculated using weights of the other statistics on a particular date, according to the following equations:

$$\text{score} = 100 - \text{weight}$$
$$\text{weight} = \frac{\text{count}_{date}}{\text{count}_{average}} \times 100$$
$$\text{count}_{average} = \frac{\sum_j \text{count}_{transactional}}{\text{count}_{non\text{-}zero}},$$

where $\text{count}_{date}$ is a count (e.g., a numerical parameter defining a statistic, such as a number of received records) of the current statistic on the particular date, $\text{count}_{average}$ is an average count of the other statistics on the particular date, $\Sigma \text{count}_{transactional}$ is a sum of valid transactional counts (e.g., numerical parameters defining statistics, such as insertion, deletion, update counts, etc.) of the other statistics for an average count time period, and $\text{count}_{non\text{-}zero}$ is a count of non-zero values of the other statistics for the average count time period. If a value of weight is greater than "100," then the value of weight may be set to "100" and score may be calculated to be zero (e.g., 100−100).

In one example, a transaction count of each statistic may be differentiated by population type (e.g., single flush, incremental, incremental by percentage, must increment, decrement, actual count, etc. population types), and statistic scores 460 may be customized based on the population type. In another example, statistic scores 460 may be segregated based on a scale (e.g., a score of "0" to "30" may indicate that a statistic is "good" or unlikely to be an issue, a score of "31" to "70" may indicate that a statistic is "not bad" but may be an issue, and a score of "71" to "100" may indicate that a statistic is "critical" and should be addressed). User interface 400 may provide for display the scale of statistic scores 460 (e.g., to user device 110), and/or may provide for display (e.g., to user device 110) a visual indication (e.g., a color coded scale, such as "green" is "good," "yellow" is "not bad," and "red" is "critical") of statistic scores 460.

In another example, the statistic may represent information about a database at a given point in time (e.g., which may be referred to as an attribute or meta-data). The meta-data may be collected over a period of time, and may be analyzed and interpreted to represent meaningful conditions that may permit prediction of the health of the database. The statistics may be used to make informed decisions based on methods that may summarize or describe a collection of data (e.g., descriptive statistics). Patterns in the data may be modeled to account for randomness and/or uncertainty in observations, and may be used to draw inferences about a process or population being studied (e.g., inferential statistics). A process may be used to determine current transaction counts against each database object that is of interest (e.g., project, table, column, etc.). Based on the difference between an expected result and an actual result, the measurements of each statistic may be normalized to score between zero and one-hundred, as described above.

Health reporter 430 may include any hardware and/or software based logic (e.g., processing logic 220) that enables dashboard server 120 to check a status of each job (e.g., job 340) based on job logs (e.g., provided by job tracking system 130), and to generate and/or update health reports 470 (e.g., job health check reports, drive health check reports, server health check reports, etc.). In one implementation, health reporter 430 may provide health reports 470 to onsite team 310 (or a user device associated with onsite team 310), offsite team 320 (or a user device associated with offsite team 320), user device 110, etc. at specified time periods (e.g., hourly, daily, weekly, etc.). Further details of health reports 470 are provided below in connection with FIGS. 9-13.

Dashboard reporter 440 may include any hardware and/or software based logic (e.g., processing logic 220) that enables dashboard server 120 to analyze a performance of each job (e.g., job 340) based on statistics provided in scoring database 410, statistic scores 460, etc., and to generate and/or update dashboard reports 480 based on the analysis. In one implementation, dashboard reporter 440 may analyze performance and stability of jobs, tables, columns, web services, drive space, etc., and may generate dashboard reports 480 based on such analyses. Dashboard reports 480 may include an explanation of any abnormalities detected during the analyses, and may provide a complete picture of statuses of one or more networks, network devices, applications executing on the network devices, etc. In one example, dashboard reporter 440 may provide dashboard reports 480 to onsite team 310 (or a user device associated with onsite team 310), offsite team 320 (or a user device associated with offsite team 320), user device 110, etc. at specified time periods (e.g., hourly, daily, weekly, etc.). Further details of dashboard reports 480 are provided below in connection with FIGS. 6 and 7.

Snapshot reporter 450 may include any hardware and/or software based logic (e.g., processing logic 220) that enables dashboard server 120 to receive statuses of jobs (e.g., job 340) currently executing, and to generate and/or update snapshot reports 490 based on the received statuses. In one implementation, snapshot reporter 450 may receive status information associated with an executing job, a start time associated with the executing job, a current duration associated with the executing job, an average duration associated with the executing job, an offset duration associated with the executing job, message information associated with the executing job, etc., and may generate snapshot reports 490 based on this information. In one example, snapshot reporter 450 may provide snapshot reports 490 to onsite team 310 (or a user device associated with onsite team 310), offsite team 320 (or a user device associated with offsite team 320), user device 110, etc. at specified time periods (e.g., hourly, daily, weekly, etc.). Further details of snapshot reports 490 are provided below in connection with FIG. 8.

Although FIG. 4 shows exemplary components of dashboard server 120, in other implementations, dashboard server 120 may contain fewer, different, or additional components than depicted in FIG. 4. In still other implementations, one or more components of dashboard server 120 may perform one or more other tasks described as being performed by one or more other components of dashboard server 120.

FIG. 5 illustrates an exemplary portion 500 of scoring database 410 capable of being provided in dashboard server 120 (e.g., within storage device 250) and/or managed by dashboard server 120. The information provided in database portion 500 may be provided by any device in network 100, and/or by any device provided in a network separate from network 100. For example, as described above in connection with FIG. 4, scoring database 410 may receive statistical information, such as table statistics, column statistics, job statistics, drive space statistics, application status, web service statistics, web service log statistics, event log statistics, etc. from networks, network devices, applications executing on the network devices, etc.

As illustrated, database portion 500 may include a variety of information, such as a table statistics category 505, a column statistics category 510, a job statistics category 515, a drive space statistics category 520, an application status category 525, a web service statistics category 530, a web service log statistics category 535, and an event log statistics category 540. Each category of database portion 500 may include multiple information-associated records. For example, as shown in FIG. 5, database portion 500 may include a first record 545, a second record 550, and a third record 555. Although database portion 500 depicts three records, in other implementations, database portion 500 may include fewer, more, or different records than depicted in FIG. 5. Furthermore, database portion 500 may include fewer, different, or additional categories than depicted in FIG. 5.

Table statistics category 505 may include statistics (e.g., count, sum, mean, maximum, minimum, standard deviation, etc.) associated with tables provided by any device in network 100 and/or any device provided in a network separate from network 100. For example, first record 545 may include a name "COUNT" under table statistics category 505, second record 550 may include a name "SUM" under table statistics category 505, and third record 555 may include a name "MEAN" under table statistics category 505. A process, if applied to a database table, may be referred to as "table statistics," as it may depend on statistical data of the table's attributes. For example, a number of rows in a table (e.g., a table that holds a list of customers for a company) may be tracked, and a number of rows in this table may never be less than a last count plus or minus a few percent (e.g., adjusted for new acquisitions and/or defections).

Column statistics category 510 may include statistics (e.g., count, sum, mean, maximum, minimum, standard deviation, etc.) associated with columns of tables provided by any device in network 100 and/or any device provided in a network separate from network 100. For example, first record 545 may include a name "MAX" (i.e., maximum) under column statistics category 510, second record 550 may include a name "MIN" (i.e., minimum) under column statistics category 510, and third record 555 may include a name "STD. DEV." (i.e., standard deviation) under column statistics category 510. A process, if applied to database columns, may be referred to as "column statistics," as it may depend on statistical data of a table's column values. For example, a number of empty values for a specific field in a table (e.g., a table that holds a list of customers for a company) may be tracked, and a number of rows in this table that have an empty phone number may never be less than a last count plus or minus a few percent (e.g., adjusted for updates that may have occurred).

Job statistics category 515 may include statistics and/or information (e.g., job name, run duration, job status (e.g., job did not execute, job executed without delay, job executed with delay, job failed, job canceled, etc.), etc.) associated with jobs executing on any device in network 100 and/or any device provided in a network separate from network 100. For example, first record 545 may include a name "NAME" (i.e., job name) under job statistics category 515, second record 550 may include a name "STATUS" (i.e., job status) under job statistics category 515, and third record 555 may include a name "DURATION" (i.e., execution duration of job) under job statistics category 515. A process, if applied to database jobs, may be referred to as "job statistics," as it may depend on statistical data of the job (e.g., may be based on time duration information). For example, if a database job typically takes twenty minutes in a second step of a process and a current job takes over two-hundred minutes in the second step, it may be safe to assume that manual intervention is needed.

Drive space statistics category 520 may include statistics and/or information (e.g., drive name, total (memory) space, free (memory) space, percentage free (memory) space, a score, status, etc.) associated with drives (e.g., "H" drive, "I" drive, etc.) provided by any device in network 100 and/or any device provided in a network separate from network 100. For example, first record 545 may include a name "NAME" (i.e., drive name) under drive space statistics category 520, second record 550 may include a name "SPACE" (i.e., total space, free space, etc.) under drive space statistics category 520, and third record 555 may include a name "STATUS" (i.e., drive status) under drive space statistics category 520. A process, if applied to available free space on a disk drive, may be referred to as "drive space statistics."

Application status category 525 may include information (e.g., application name, application status, application size, etc.) associated with applications (e.g., software applications, etc.) provided and/or executed by any device in network 100 and/or any device provided in a network separate from network 100. For example, first record 545 may include a name "NAME" (i.e., application name) under application status category 525, second record 550 may include a name "STATUS" (i.e., application status) under application status category 525, and third record 555 may include a name "SIZE" (i.e., application size) under application status category 520. A process, if applied to statistics collected about application error and information logs, may be referred to as "application statistics."

Web service statistics category 530 may include statistics and/or information (e.g., time a web service started, active connections, served connections, etc.) associated with web services (e.g., web-based applications, etc.) provided by any device in network 100 and/or any device provided in a network separate from network 100. For example, first record 545 may include a name "TIME" (i.e., time a web service started) under web service statistics category 530, second record 550 may include a name "ACTIVE" (i.e., active connections for the web service) under web service statistics category 530, and third record 555 may include a name "SERVED" (i.e., served connections for the web service) under web service statistics category 530. A process, if applied to statistics collected about a web service, may be referred to as "web service statistics."

Web service log statistics category 535 may include statistics and/or information (e.g., number of hits, number of pages viewed, bandwidth used, etc.) associated with web services (e.g., web-based applications, etc.) provided by any device in network 100 and/or any device provided in a network separate from network 100. For example, first record 545 may include a name "HITS" (i.e., number of hits for a web service) under web service log statistics category 535, second record 550 may include a name "PAGES" (i.e., number of pages viewed of the web service) under web service log statistics category 535, and third record 555 may include a name "B/WIDTH" (i.e., bandwidth used for the web service) under web service log statistics category 535. A process, if applied to statistics collected about web service error and information logs, may be referred to as "web service log statistics."

Event log statistics category 540 may include statistics and/or information (e.g., whether a device rebooted, duration of an event, etc.) associated with events provided by and/or occurring in any device in network 100 and/or any device provided in a network separate from network 100. For example, first record 545 may include a name "REBOOTED" (i.e., indicating a reboot event occurred) under event log statistics category 540, second record 550 may include a name "DURATION" (i.e., a duration of an event) under event log statistics category 540, and third record 555 may include a name "OTHER" (i.e., other event statistics or information) under event log statistics category 540. A process, if applied to statistics collected about application event logs, may be referred to as "event log statistics." For example, if a system fails 0.2% of the time (e.g., four transactions out of two-thousand transactions may fail) and more than sixteen failures occur and a particular day, it may be safe to assume that manual intervention is needed.

In one implementation, the dashboard application provided by dashboard server 120 may automatically discover new statistics (e.g., new objects added to tables, columns, etc.), and may add the new statistics to table statistics category 505, column statistics category 510, job statistics category 515, drive space statistics category 520, application status category 525, web service statistics category 530, web service log statistics category 535, event log statistics category 540, and/or a new category of scoring database 410.

Although FIG. 5 shows exemplary information that may be provided in database portion 500, in other implementations, database portion 500 may contain fewer, different, or additional information than depicted in FIG. 5.

FIGS. 6-13 depict exemplary user interfaces 600-1300 that may be provided by dashboard server 120 (e.g., via user interface 400). In one implementation, user interfaces 600-1300 may display a variety of reports capable of being provided by the dashboard application of dashboard server 120 (e.g., to user device 110). In one example, the variety of reports may be generated and provided (e.g., via email, directly, via a download, etc.) to a user of user device 110 with a single selection mechanism (e.g., a single click of a mouse).

Figure 6:
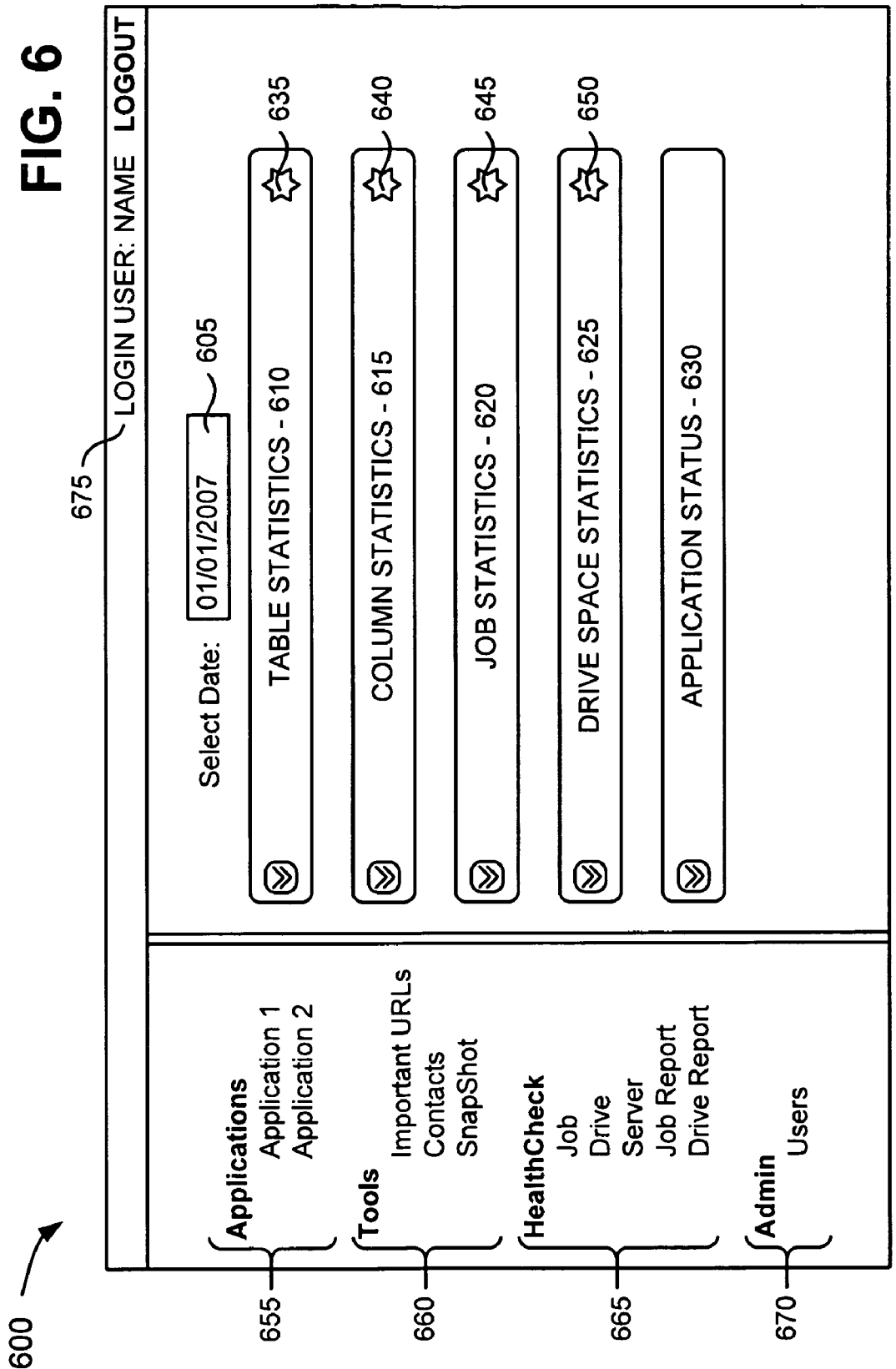
FIGS. 6-13 depict exemplary user interfaces capable of being provided by the dashboard server of the network illustrated in FIG. 1.

If a user executes the dashboard application (e.g., via user device 110), a user interface 600 (e.g., a dashboard report), as shown in FIG. 6, may be displayed to the user. As illustrated, user interface 600 may include a variety of information associated with the dashboard application. In one implementation, user interface 600 may include a date selection mechanism 605, a table statistics section 610, a column statistics section 615, a job statistics section 620, a drive space statistics section 625, an application status section 630, status indicators 635-650, an applications menu 655, a tools menu 660, a health check menu 665, an administrative menu 670, and/or a login/logout mechanism 675.

Date selection mechanism 605 may include a mechanism that enables a user to input date information associated with one or more networks, network devices, applications executing on the network devices, etc. being monitored and managed by the dashboard application. For example, date selection mechanism 605 may include an input field (e.g., for typing a date), a drop-down menu (e.g., for selecting a date from a calendar), and/or other types of input mechanisms.

Table statistics section 610, if selected (e.g., with a selection mechanism, such as a mouse), may provide table statistics information associated with one or more networks, network devices, applications executing on the network devices, etc. being monitored and managed by the dashboard application. For example, table statistics section 610 may include statistics (e.g., count, sum, mean, maximum, minimum, standard deviation, etc.) associated with tables provided by any device in network 100 and/or any device provided in a network separate from network 100. In one implementation, table statistics section 610 may be associated with status indicator 635 in order to provide status information for the table statistics information.

Column statistics section 615, if selected (e.g., with a selection mechanism, such as a mouse), may provide column statistics information associated with one or more networks, network devices, applications executing on the network devices, etc. being monitored and managed by the dashboard application. For example, column statistics section 615 may include statistics (e.g., count, sum, mean, maximum, minimum, standard deviation, etc.) associated with columns provided by any device in network 100 and/or any device provided in a network separate from network 100. In one implementation, column statistics section 615 may be associated with status indicator 640 in order to provide status information for the column statistics information.

Job statistics section 620, if selected (e.g., with a selection mechanism, such as a mouse), may provide job statistics information associated with one or more networks, network devices, applications executing on the network devices, etc. being monitored and managed by the dashboard application. For example, job statistics section 620 may include statistics and/or information (e.g., job name, run duration, job status (e.g., job did not execute, job executed without delay, job executed with delay, job failed, job canceled, etc.), etc.) associated with jobs related to any device in network 100 and/or any device provided in a network separate from network 100. In one implementation, job statistics section 620 may be associated with status indicator 645 in order to provide status information for the job statistics information.

Drive space statistics section 625, if selected (e.g., with a selection mechanism, such as a mouse), may provide drive space statistics information associated with one or more networks, network devices, applications executing on the network devices, etc. being monitored and managed by the dashboard application. For example, drive space statistics section 625 may include statistics and/or information (e.g., drive name, total space, free space, percentage free space, score, status, etc.) associated with drives (e.g., "H" drive, "I" drive, etc.) provided by any device in network 100 and/or any device provided in a network separate from network 100. In one implementation, drive space statistics section 625 may be associated with status indicator 650 in order to provide status information for the drive space statistics information.

Application status section 630, if selected (e.g., with a selection mechanism, such as a mouse), may provide application status information associated with one or more networks, network devices, applications executing on the network devices, etc. being monitored and managed by the dashboard application. For example, application status section 630 may include information (e.g., application name, application status, application size, etc.) associated with applications (e.g., software applications, etc.) provided and/or executed by any device in network 100 and/or any device provided in a network separate from network 100.

Status indicators 635-650 may provide visual indications of statuses of table statistics section 610, column statistics section 615, job statistics section 620, and drive space statistics section 625, respectively. For example, status indicators 635-650 may provide colored status indicators (e.g., red may indicate issues, yellow may indicate potential issues, and green may indicate that there are no issues), shaped status indicators (e.g., an octagon may indicate issues, a triangle may indicate potential issues, and a circle may indicate that there are no issues), image-based indicators (e.g., a stop sign may indicate issues, a yield sign may indicate potential issues, and a green light may indicate that there are no issues), and/or combinations of the aforementioned.

Applications menu 655 may include a menu of applications (e.g., software applications) associated with one or more networks, network devices, applications executing on the network devices, etc. being monitored and managed by the dashboard application. One or more applications listed in applications menu 655 may be selected by a user (e.g., via user device 110), and the dashboard application may provide for display information associated with the selected applications (e.g., statistical information, status information, etc.). In one implementation, as shown in FIG. 6, applications menu 655 may include two applications (e.g., "Application 1" and "Application 2") from which the user may select.

Tools menu 660 may include a menu of tools that may aid a user with monitoring and managing one or more networks, network devices, applications executing on the network devices, etc. being monitored and managed by the dashboard application. One or more tools listed in tools menu 660 may be selected by a user (e.g., via user device 110), and the dashboard application may provide for display information associated with the selected tools (e.g., uniform resource locator (URL) information, contact information, snapshot information, etc.). In one implementation, as shown in FIG. 6, tools menu 660 may include three tools (e.g., "Important URLs," "Contacts," and "SnapShot") from which the user may select. Further details of the "SnapShot" tool are provided below in connection with FIG. 8.

Health check menu 665 may include a menu of health checks that may aid a user with monitoring and managing one or more networks, network devices, applications executing on the network devices, etc. being monitored and managed by the dashboard application. One or more health checks listed in health check menu 665 may be selected by a user (e.g., via user device 110), and the dashboard application may provide for display information associated with the selected health checks (e.g., job information, drive space information, server information, job report information, drive report information, etc.). In one implementation, as shown in FIG. 6, health check menu 665 may include five health checks (e.g., "Job," "Drive," "Server," "Job Report," and "Drive Report") from which the user may select. Health checks may be provided daily for each job, including active and scheduled jobs and drives across a network. Further details of health check menu 665 are provided below in connection with FIGS. 9-13.

Administrative menu 670 may include a menu of administrative information (e.g., users of the dashboard application, authentication information, etc.) associated with users of the dashboard application. Administrative information listed in administrative menu 670 may be selected by a user (e.g., via user device 110), and the dashboard application may provide for display information associated with the selected information (e.g., user information, etc.). In one implementation, as shown in FIG. 6, administrative menu 670 may include an administrative entry (e.g., "Users") from which the user may select.

Login/logout mechanism 675 may include a mechanism (e.g., an icon, a link, etc.) for a user of the dashboard application to login to the dashboard application (e.g., an authentication mechanism), and a mechanism (e.g., an icon, a link, etc.) for the user to logout of the dashboard application. For example, in one implementation, dashboard server 120 may provide an authentication mechanism to prevent unauthorized users from accessing dashboard server 120 and/or the software application or web-based application (e.g., the dashboard application) provided by dashboard server 120. The authentication mechanism may provide levels of authorization that may permit access to more or less of the services offered by dashboard server 120 based on a level of a user (e.g., a network administrator level, a production support level, an executive level, etc.).

Although FIG. 6 shows exemplary elements of user interface 600, in other implementations, user interface 600 may contain fewer, different, or additional elements than depicted in FIG. 6.

Figure 7:
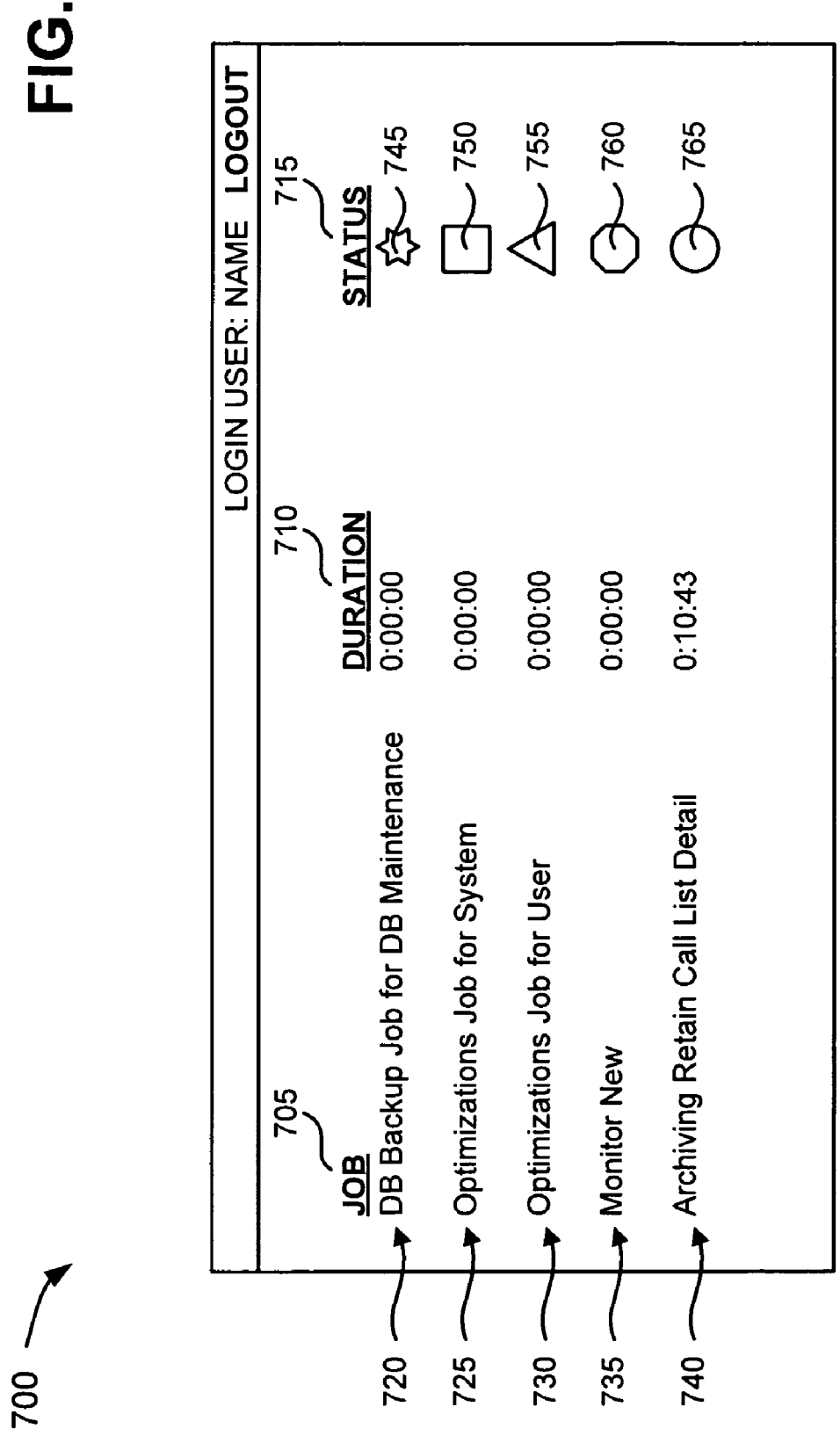

FIG. 7 depicts a user interface 700 (e.g., a dashboard report) that may be displayed to a user (e.g., via user device 110) by the dashboard application (e.g., provided by dashboard server 120). As illustrated, user interface 700 may include a variety of information associated with job statistics provided by the dashboard application. In one implementation, user interface 700 may include a job category 705, a job duration category 710, a job status category 715, records 720-740 associated with job category 705, job duration category 710, and job status category 715, and status indicators 745-765.

Job category 705 may include information (e.g., job names) associated with jobs executing on any device in network 100 and/or any device provided in a network separate from network 100. For example, record 720 may include a job name "DB Backup Job for DB Maintenance" under job category 705, record 725 may include a job name "Optimizations Job for System" under job category 705, record 730 may include a job name "Optimizations Job for User" under job category 705, record 735 may include a job name "Monitor New" under job category 705, and record 740 may include a job name "Archiving Retain Call List Detail" under job category 705.

Job duration category 710 may include information (e.g., durations of jobs) associated with jobs executing on any device in network 100 and/or any device provided in a network separate from network 100. For example, records 720-735 may include job durations of "0:00:00" (e.g., in hours, minutes, and seconds) under job duration category 710, and record 740 may include a job duration of "0:10:43" under job duration category 710.

Job status category 715 may include information (e.g., job status) associated with jobs executing on any device in network 100 and/or any device provided in a network separate from network 100. For example, record 720 may include status indicator 745 under job status category 715, record 725 may include status indicator 750 under job status category 715, record 730 may include status indicator 755 under job status category 715, record 735 may include status indicator 760 under job status category 715, and record 740 may include status indicator 765 under job status category 715.

Status indicators 745-765 may provide visual indications of statuses of jobs listed under job category 705. For example, status indicators 745-765 may provide colored status indicators (e.g., red may indicate issues, yellow may indicate potential issues, and green may indicate that there are no issues), shaped status indicators (e.g., an octagon may indicate issues, a triangle may indicate potential issues, and a circle may indicate that there are no issues), image-based indicators (e.g., a stop sign may indicate issues, a yield sign may indicate potential issues, and a green light may indicate that there are no issues), and/or combinations of the aforementioned. In one implementation, as shown in FIG. 7, status indicator 745 may indicate that a job (e.g., the job listed in record 720) did not execute, status indicator 750 may indicate that a job (e.g., the job listed in record 725) executed successfully without delay, status indicator 755 may indicate that a job (e.g., the job listed in record 730) executed successfully with delay, status indicator 760 may indicate that a job (e.g., the job listed in record 735) failed, and status indicator 765 may indicate that a job (e.g., the job listed in record 740) was canceled.

Although FIG. 7 shows exemplary elements of user interface 700, in other implementations, user interface 700 may contain fewer, different, or additional elements than depicted in FIG. 7.

Figure 8:
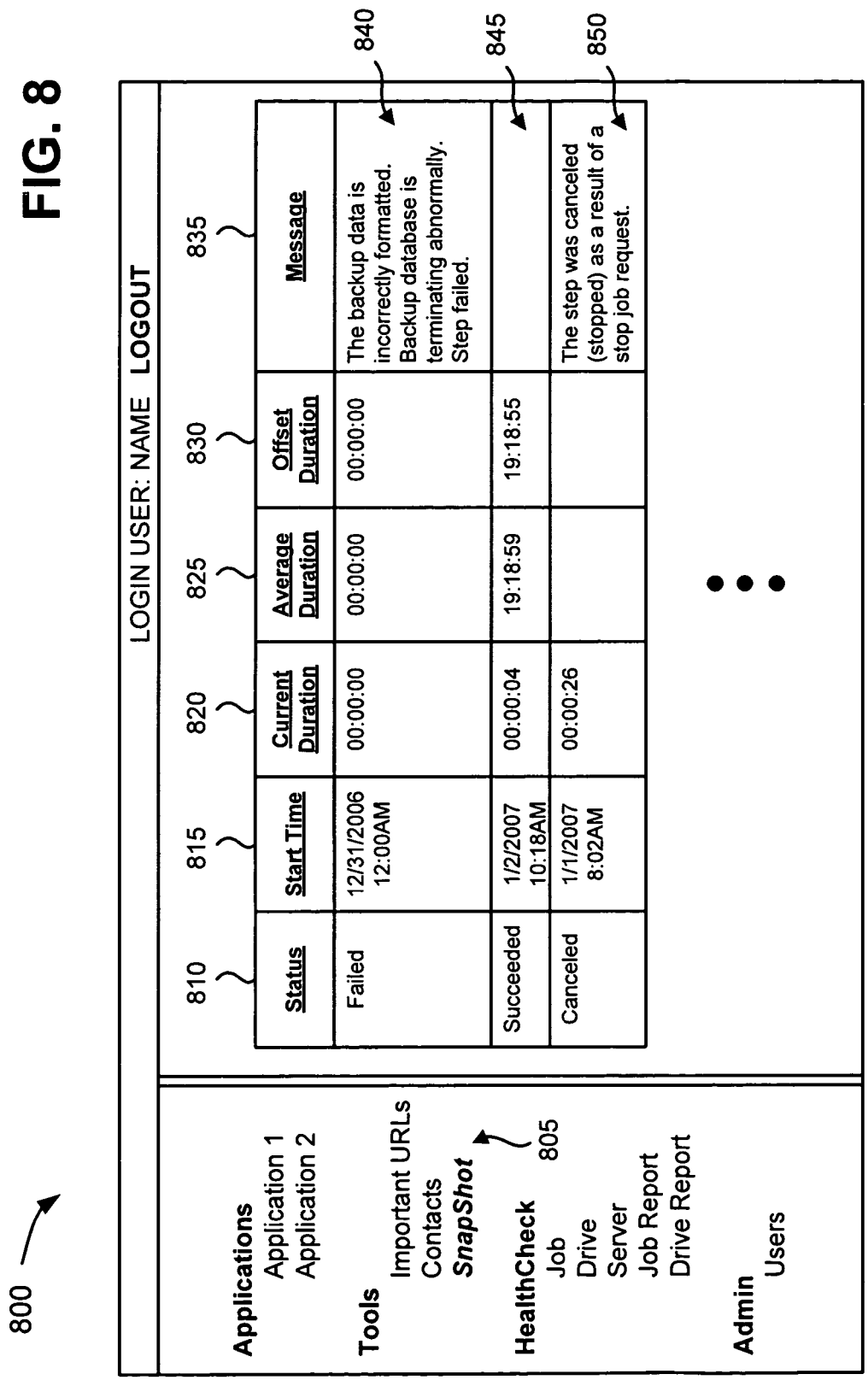

If a user selects the "SnapShot" tool provided in tools menu 660 (e.g., via user device 110), user interface 800, as shown in FIG. 8, may be displayed to the user. As illustrated, user interface 800 may include a variety of information (e.g., a "live" status of executing jobs) associated with the "SnapShot" tool of the dashboard application. In one implementation, user interface 800 may highlight the "SnapShot" tool (as indicated by reference number 805) and may include a job status category 810, a job start time category 815, a job current duration category 820, a job average duration category 825, a job offset duration category 830, a job message category 835, and a first record 840, a second record 845, and a third record 850 associated with categories 810-835.

Job status category 810 may include information (e.g., statuses of currently executing jobs) associated with jobs executing on any device in network 100 and/or any device provided in a network separate from network 100. For example, first record 840 may indicate that a job "Failed" under job status category 810, second record 845 may indicate that a job "Succeeded" under job status category 810, and third record 845 may indicate that a job was "Canceled" under job status category 810.

Job start time category 815 may include information (e.g., start times of currently executing jobs) associated with jobs executing on any device in network 100 and/or any device provided in a network separate from network 100. For example, first record 840 may indicate that a job began executing at "Dec. 31, 2006, 12:00 AM" under job start time category 815, second record 845 may indicate that a job began executing at "Jan. 2, 2007, 10:18 AM" under job start time category 815, and third record 845 may indicate that a job began executing at "Jan. 1, 2007, 8:02 AM" under job start time category 815.

Job current duration category 820 may include information (e.g., durations of currently executing jobs) associated with jobs executing on any device in network 100 and/or any device provided in a network separate from network 100. For example, first record 840 may indicate that a job has been executing for a time period of "00:00:00" under job current duration category 820, second record 845 may indicate that a job has been executing for a time period of "00:00:04" under job current duration category 820, and third record 845 may indicate that a job has been executing for a time period of "00:00:26" under job current duration category 820.

Job average duration category 825 may include information (e.g., average durations of currently executing jobs) associated with jobs executing on any device in network 100 and/or any device provided in a network separate from network 100. For example, first record 840 may indicate that a job has been executing on average for time period of "00:00:00" under job average duration category 825, second record 845 may indicate that a job has been executing on average for a time period of "19:18:59" under job average duration category 825, and third record 845 may not provide a time period under job average duration category 825 since the job associated with third record 845 was canceled.

Job offset duration category 830 may include information (e.g., offset durations of currently executing jobs) associated with jobs executing on any device in network 100 and/or any device provided in a network separate from network 100. For example, first record 840 may indicate that a job has been executing for an offset duration of "00:00:00" under job offset duration category 830, second record 845 may indicate that a job has been executing for an offset duration of "19:18:55" under job offset duration category 830, and third record 845 may not provide a time period under job offset duration category 830 since the job associated with third record 845 was canceled.

Job message category 835 may include information (e.g., messages of currently executing jobs) associated with jobs executing on any device in network 100 and/or any device provided in a network separate from network 100. For example, first record 840 may provide a job error message (e.g., "The backup data is incorrectly formatted. Backup database is terminating abnormally. Step failed.") under job message category 835, second record 845 may not provide a job error message under job message category 835 since the job associated with second record 845 succeeded, and third record 845 may provide a job error message (e.g., "The step was canceled (stopped) as a result of a stop job request.") under job message category 835.

The "SnapShot" tool depicted by user interface 800 may be used to view "live" statuses of executing jobs. Before the development of the "SnapShot" tool, if a job failed, a user would have to check a log file in a file transfer protocol (FTP) location. If the log file was not refreshed, the user would have to wait until the log file was loaded with the latest data. If the log file did not exist, the user would be unable to determine why the job failed. In contrast, the "SnapShot" tool may provide detailed information associated with currently executing jobs, and a user may quickly and easily determine if a job failed, succeeded, or was canceled. Furthermore, before the development of the "SnapShot" tool, if a job was running for more than an expected duration or if a job was canceled for some reason, it was not possible for the user to have knowledge of such information (e.g., such information was not available in the log files). In contrast, the "SnapShot" tool may provide job offset duration category 830 from which the user may determine if a job was running for more than an expected duration, and may provide job message category 835 from which the user may determine if a job was canceled and a reason for the cancellation.

Although FIG. 8 shows exemplary elements of user interface 800, in other implementations, user interface 800 may contain fewer, different, or additional elements than depicted in FIG. 8.

Figure 9:
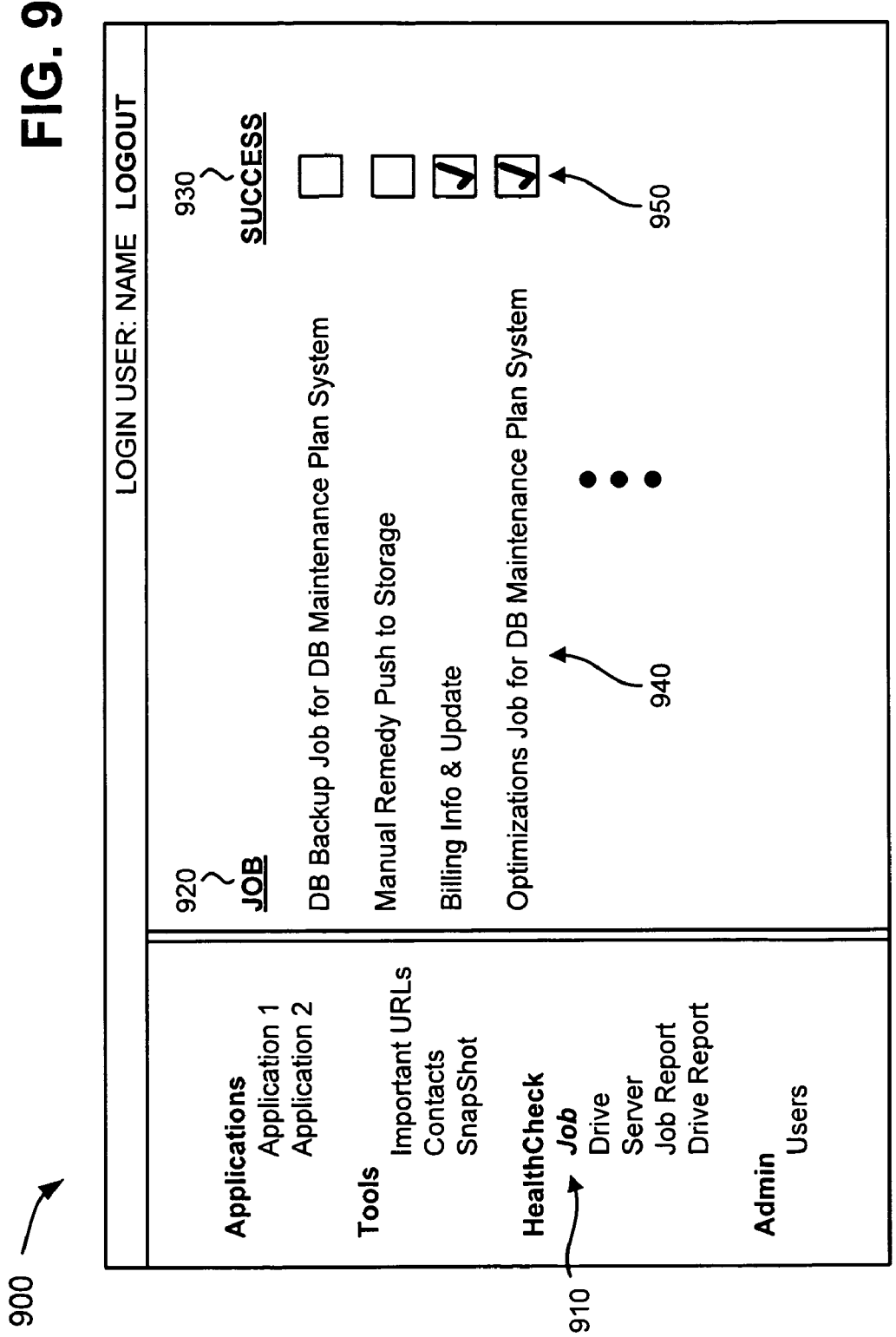

If a user selects the "Job" health check provided in health check menu 665 (e.g., via user device 110), user interface 900, as shown in FIG. 9, may be displayed to the user. As illustrated, user interface 900 may include a variety of information (e.g., job health check information) associated with the "Job" health check of the dashboard application. In one implementation, user interface 900 may highlight the "Job" health check (as indicated by reference number 910) and may include a job category 920, a job success category 930, job names 940 associated with job category 920, and jobs success information 950 associated with job success category 930.

Job category 920 may include information (e.g., job names) associated with jobs executing on any device in network 100 and/or any device provided in a network separate from network 100. For example, job category 920 may include job names 940, such as "DB Backup Job for DB Maintenance Plan System," "Manual Remedy Push to Storage," "Billing Info & Update," and "Optimizations Job for DB Maintenance Plan System."

Job success category 930 may include information (e.g., whether a job was successful) associated with jobs executing on any device in network 100 and/or any device provided in a network separate from network 100. For example, job success category 930 may provide job success information 950, such as that jobs "DB Backup Job for DB Maintenance Plan System" and "Manual Remedy Push to Storage" were not completed successfully (as indicated by the unchecked boxes), and that jobs "Billing Info & Update" and "Optimizations Job for DB Maintenance Plan System" were completed successfully (as indicated by the checked boxes).

Job names 940 may include any names or other identification information associated with jobs executing on any device in network 100 and/or any device provided in a network separate from network 100.

Job success information 950 may include any success or completion related information associated with jobs executing on any device in network 100 and/or any device provided in a network separate from network 100. For example, as shown in FIG. 9, job success information 950 may include checked boxes for successfully completed jobs and unchecked boxes for unsuccessfully completed jobs. To update a status of a job, a user may check or uncheck boxes based on the status of the job (e.g., successful or unsuccessful). In other implementations, other visual indicators may be used to display whether a job is a successful or unsuccessful.

Although FIG. 9 shows exemplary elements of user interface 900, in other implementations, user interface 900 may contain fewer, different, or additional elements than depicted in FIG. 9.

Figure 10:
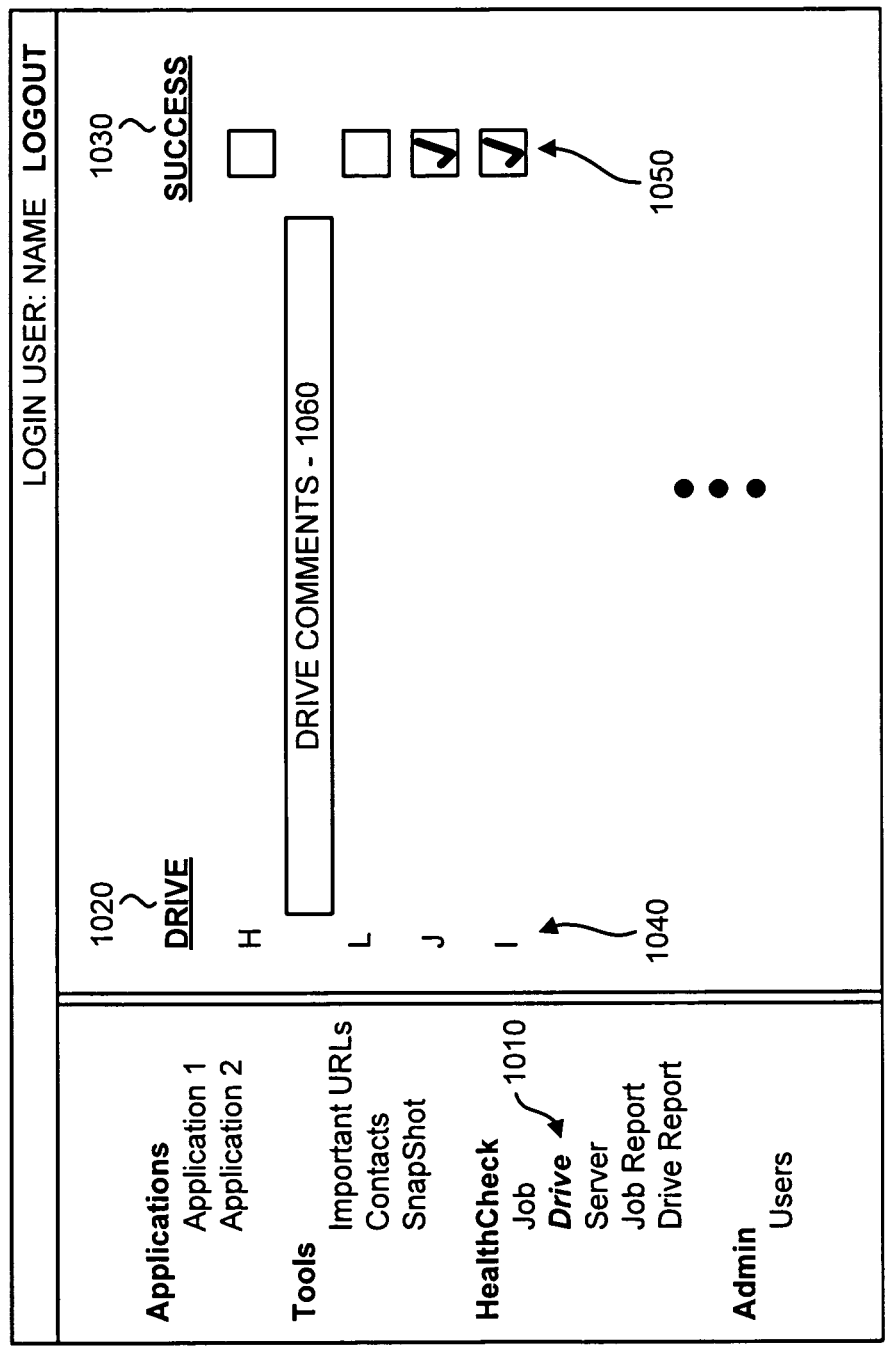

If a user selects the "Drive" health check provided in health check menu 665 (e.g., via user device 110), user interface 1000, as shown in FIG. 10, may be displayed to the user. As illustrated, user interface 1000 may include a variety of information (e.g., drive health check information) associated with the "Drive" health check of the dashboard application. In one implementation, user interface 1000 may highlight the "Drive" health check (as indicated by reference number 1010) and may include a drive category 1020, a drive success category 1030, drive names 1040 associated with drive category 1020, drive success information 1050 associated with drive success category 1030, and a drive comments section 1060.

Drive category 1020 may include information (e.g., drive names) associated with drives of any device in network 100 and/or any device provided in a network separate from network 100. For example, drive category 1020 may include drive names 1040, such as "H," "L," "J," and "I."

Drive success category 1030 may include drive information (e.g., whether a drive is successfully operating) associated with any device in network 100 and/or any device provided in a network separate from network 100. For example, drive success category 1030 may provide drive success information 1050, such as that drives "H" and "L" are unsuccessfully operating (as indicated by the unchecked boxes), and that drives "J" and "I" are successfully operating (as indicated by the checked boxes).

Drive names 1040 may include any names or other identification information associated with drives of any device in network 100 and/or any device provided in a network separate from network 100. For example, drive names 1040 may include names of drives provided on a network server.

Drive success information 1050 may include operational related information associated with drives of any device in network 100 and/or any device provided in a network separate from network 100. For example, as shown in FIG. 10, drive success information 1050 may include checked boxes for successfully operating drives and unchecked boxes for unsuccessfully operating drives. To update a status of a drive, a user may check or uncheck boxes based on the status of the drive (e.g., successfully operating or unsuccessfully operating). In other implementations, other visual indicators may be used to display whether a drive is successfully or unsuccessfully operating.

Drive comments section 1060 may be provided for any drive displayed by user interface 1000, and may permit a user to input comments and/or other information pertaining to the drives displayed by user interface 1000. For example, as shown in FIG. 10, drive "H" may include drive comments 1060, whereas drives "L," "J," and "I" may not include drive comments 1060.

Although FIG. 10 shows exemplary elements of user interface 1000, in other implementations, user interface 1000 may contain fewer, different, or additional elements than depicted in FIG. 10.

Figure 11:
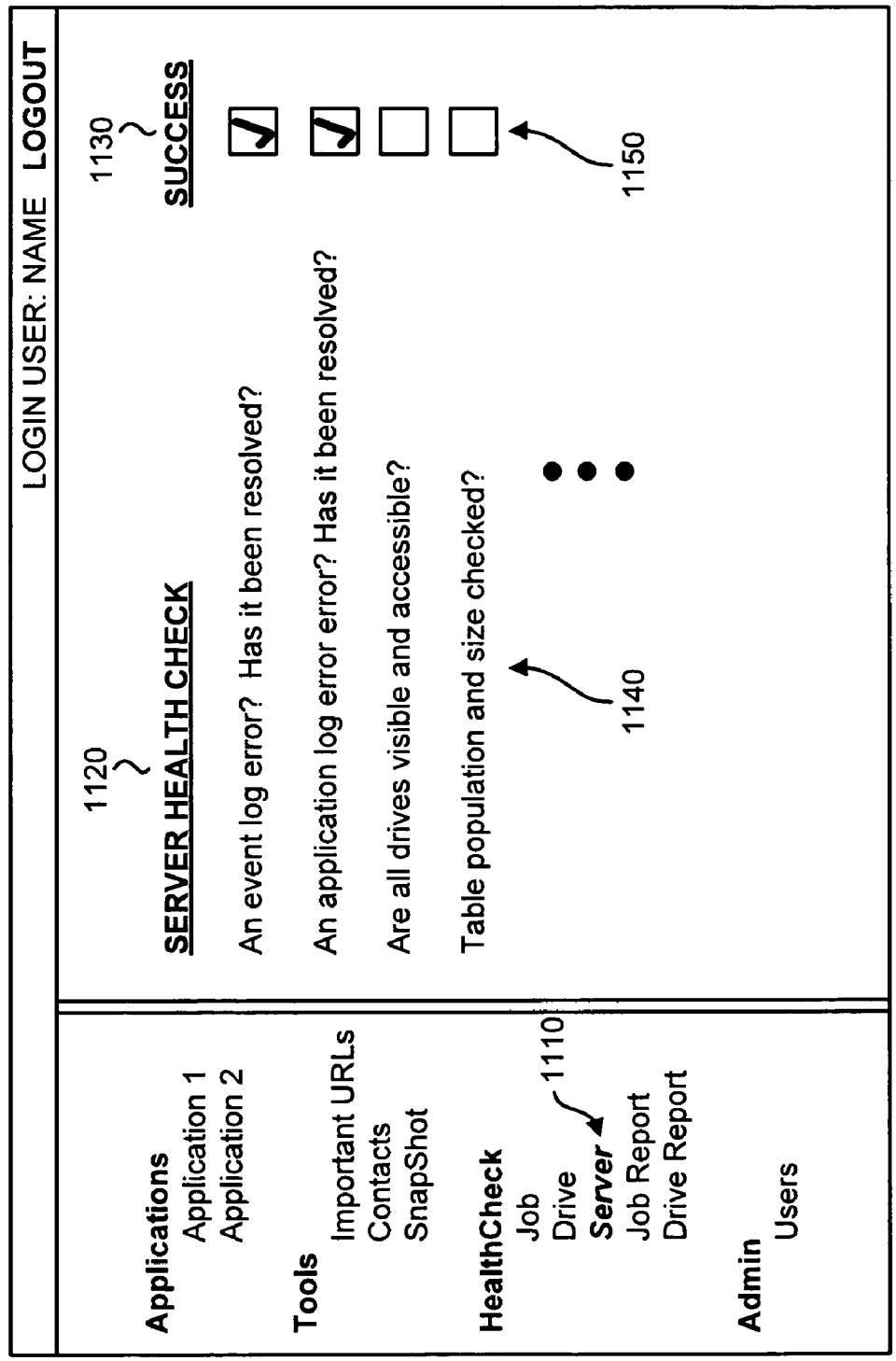

If a user selects the "Server" health check provided in health check menu 665 (e.g., via user device 110), user interface 1100, as shown in FIG. 11, may be displayed to the user. As illustrated, user interface 1100 may include a variety of information (e.g., server health check information) associated with the "Server" health check of the dashboard application. In one implementation, user interface 1100 may highlight the "Server" health check (as indicated by reference number 1110) and may include a server health check category 1120, a server health check success category 1130, server health check names 1140 associated with server health check category 1120, and server health check success information 1150 associated with server health check success category 1130.

Server health check category 1120 may include information (e.g., server health checks) associated with health checks performed on any device (e.g., server) in network 100 and/or any device (e.g., server) provided in a network separate from network 100. For example, server health check category 1120 may include server health check names 1140, such as "An event log error? Has it been resolved?", "An application log error? Has it been resolved?", "Are all drives visible and accessible?", and "Table population and size checked?".

Server health check success category 1130 may include server health check information (e.g., whether a server health check is successful) associated with any device in network 100 and/or any device provided in a network separate from network 100. For example, server health check success category 1130 may provide server health check success information 1150, such as that the first two server health check names 1140 are successful (as indicated by the checked boxes), and that second two server health check names 1140 are unsuccessful (as indicated by the unchecked boxes).

Server health check names 1140 may include any names or other identification information associated with server health checks of any device in network 100 and/or any device provided in a network separate from network 100. For example, server health check names 1140 may include names of health checks performed on one or more servers of a network.

Server health check success information 1150 may include any success or completion related information associated with health checks of any device (e.g., server) in network 100 and/or any device (e.g., server) provided in a network separate from network 100. For example, as shown in FIG. 11, server health check success information 1150 may include checked boxes for successful server health checks and unchecked boxes for unsuccessful server health checks. To update a status of a server health check, a user may check or uncheck boxes based on the status of the server health check (e.g., successful or unsuccessful). In other implementations, other visual indicators may be used to display whether a server health check is successful or unsuccessful.

Although FIG. 11 shows exemplary elements of user interface 1100, in other implementations, user interface 1100 may contain fewer, different, or additional elements than depicted in FIG. 11.

Figure 12:
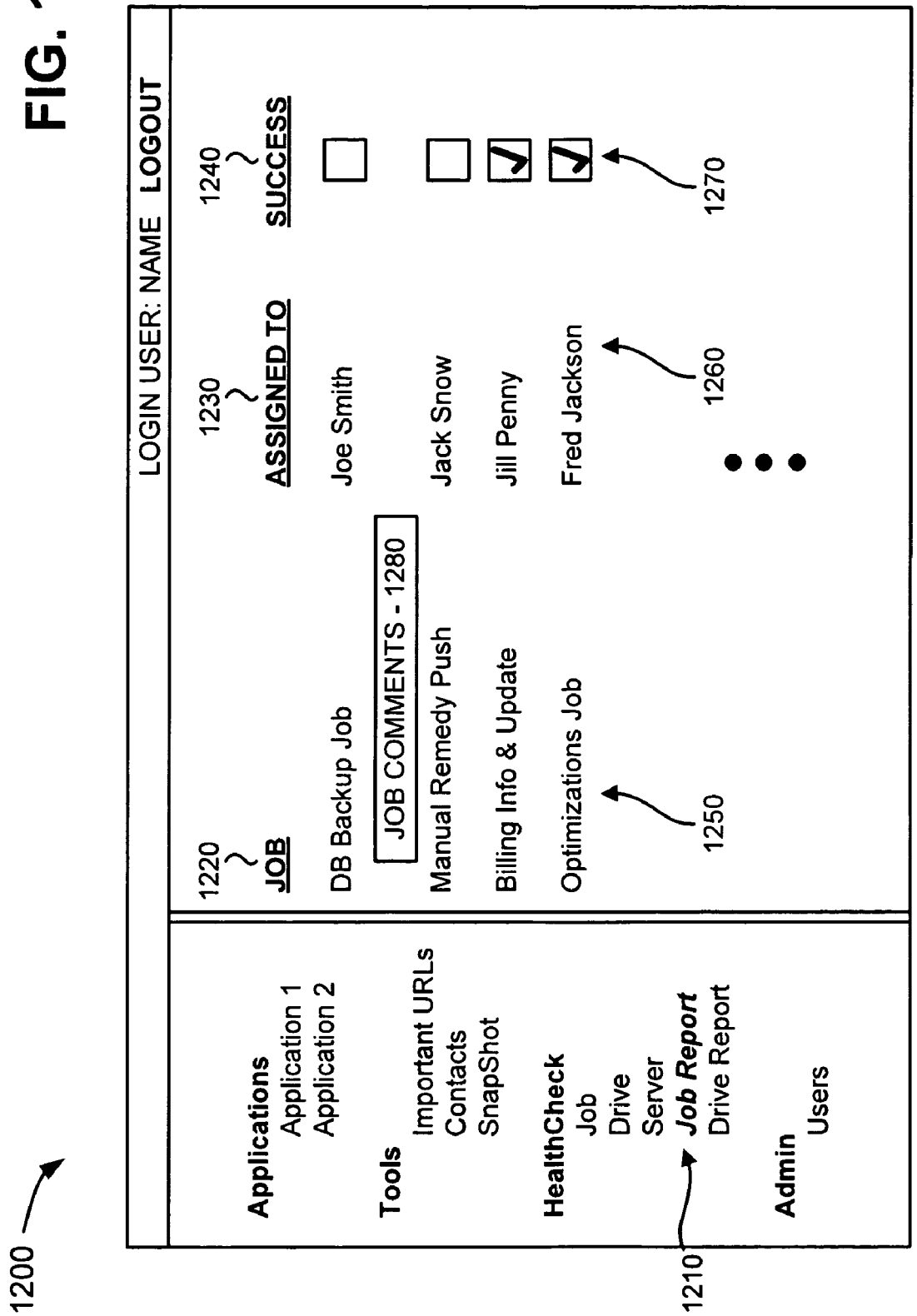

If a user selects the "Job Report" health check provided in health check menu 665 (e.g., via user device 110), user interface 1200, as shown in FIG. 12, may be displayed to the user. As illustrated, user interface 1200 may include a variety of information (e.g., job report health check information) associated with the "Job Report" health check of the dashboard application. In one implementation, user interface 1200 may highlight the "Job Report" health check (as indicated by reference number 1210) and may include a job category 1220, a job assignment category 1230, a job success category 1240, job names 1250 associated with job category 1220, user names 1260 associated with job assignment category 1230, job success information 1270 associated with job success category 1240, and a job comments section 1280.

Job category 1220 may include information (e.g., job names) associated with jobs executing on any device in network 100 and/or any device provided in a network separate from network 100. For example, job category 1220 may include job names 1250, such as "DB Backup Job," "Manual Remedy Push," "Billing Info & Update," and "Optimizations Job."

Job assignment category 1230 may include information (e.g., names of users assigned to jobs) associated with jobs executing on any device in network 100 and/or any device provided in a network separate from network 100. For example, job assignment category 1230 may include user names 1260, such as "Joe Smith," "Jack Snow," "Jill Penny," and "Fred Jackson."

Job success category 1240 may include information (e.g., whether a job was successful) associated with jobs executing on any device in network 100 and/or any device provided in a network separate from network 100. For example, job success category 1240 may provide job success information 1270, such as that jobs "DB Backup Job" and "Manual Remedy Push" were not completed successfully (as indicated by the unchecked boxes), and that jobs "Billing Info & Update" and "Optimizations Job" were completed successfully (as indicated by the checked boxes).

Job names 1250 may include any names or other identification information associated with jobs executing on any device in network 100 and/or any device provided in a network separate from network 100.

User names 1260 may include any names or other identification information associated with users assigned to jobs executing on any device in network 100 and/or any device provided in a network separate from network 100.

Job success information 1270 may include any success or completion related information associated with jobs executing on any device in network 100 and/or any device provided in a network separate from network 100. For example, as shown in FIG. 12, job success information 1270 may include checked boxes for successfully completed jobs and unchecked boxes for unsuccessfully completed jobs. To update a status of a job, a user may check or uncheck boxes based on the status of the job (e.g., successful or unsuccessful). In other implementations, other visual indicators may be used to display whether a job is a successful or unsuccessful.

Job comments section 1280 may be provided for any job displayed by user interface 1200, and may permit a user to input comments and/or other information pertaining to the jobs displayed by user interface 1200. For example, as shown in FIG. 12, job "DB Backup Job" may include job comments 1280, whereas the remaining jobs may not include job comments 1280.

Although FIG. 12 shows exemplary elements of user interface 1200, in other implementations, user interface 1200 may contain fewer, different, or additional elements than depicted in FIG. 12.

Figure 13:
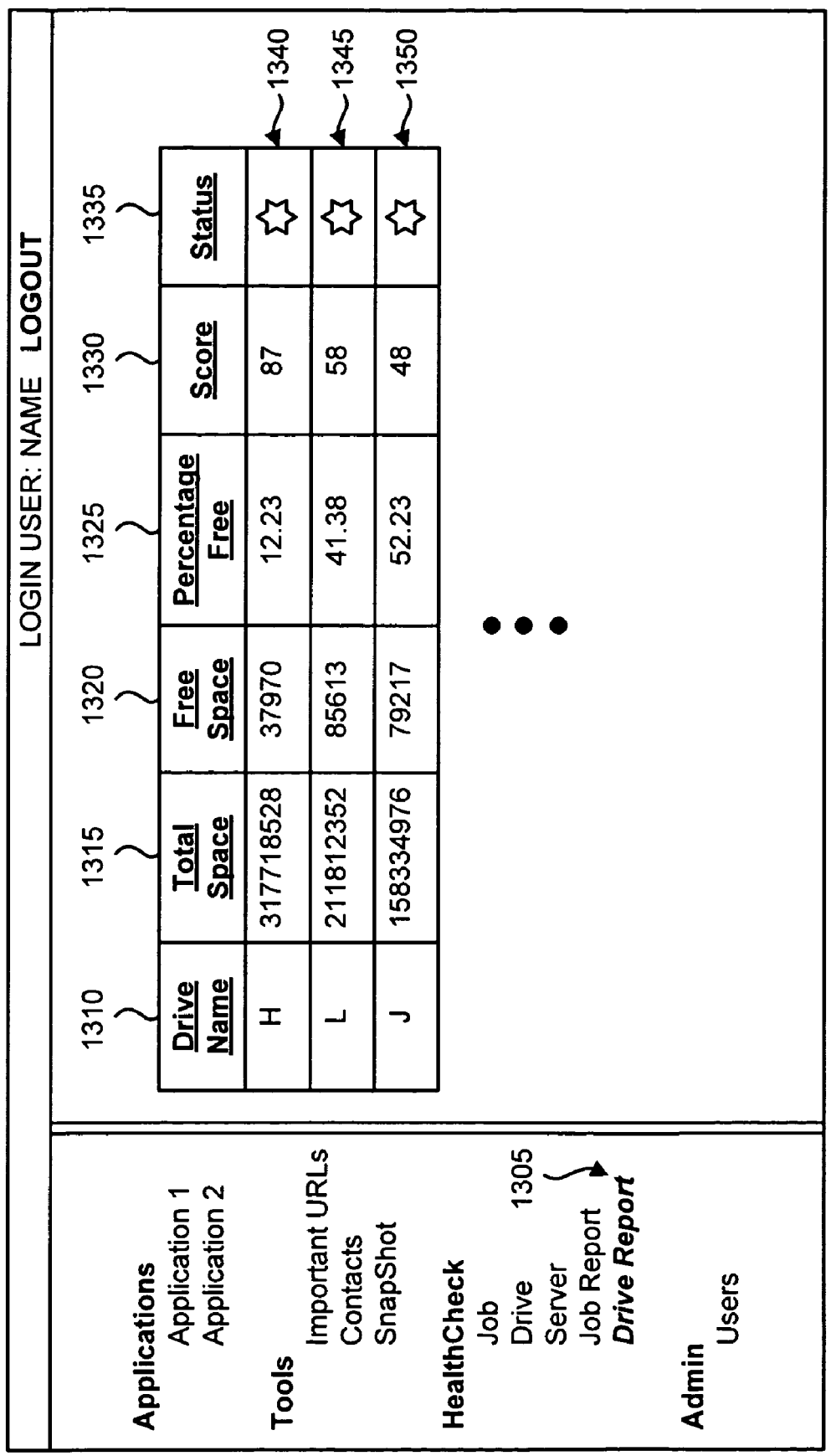

If a user selects the "Drive Report" health check provided in health check menu 665 (e.g., via user device 110), user interface 1300, as shown in FIG. 13, may be displayed to the user. As illustrated, user interface 1300 may include a variety of information (e.g., drive report health check information) associated with the "Drive Report" health check of the dashboard application. In one implementation, user interface 1300 may highlight the "Drive Report" health check (as indicated by reference number 1305) and may include a drive name category 1310, a total space category 1315, a free space category 1320, a percentage free category 1325, a score category 1330, a status category 1335, and a first record 1340, a second record 1345, and a third record 1350 associated with categories 1310-1335.

Drive name category 1310 may include information (e.g., drive names) associated with drives of any device in network 100 and/or any device provided in a network separate from network 100. For example, first record 1340 may include a drive name "H" under drive name category 1310, second record 1345 may include a drive name "L" under drive name category 1310, and third record 1350 may include a drive name "J" under drive name category 1310.

Total space category 1315 may include information (e.g., total space of a drive) associated with drives of any device in network 100 and/or any device provided in a network separate from network 100. For example, first record 1340 may indicate that drive "H" has a total space of "317718528" (e.g., bytes) under total space category 1315, second record 1345 may indicate that drive "L" has a total space of "211812352" (e.g., bytes) under total space category 1315, and third record 1350 may indicate that drive "J" has a total space of "158334976" (e.g., bytes) under total space category 1315.

Free space category 1320 may include information (e.g., free space of a drive) associated with drives of any device in network 100 and/or any device provided in a network separate from network 100. For example, first record 1340 may indicate that drive "H" has a free space of "37970" (e.g., bytes) under free space category 1320, second record 1345 may indicate that drive "L" has a free space of "85613" (e.g., bytes) under free space category 1320, and third record 1350 may indicate that drive "J" has a free space of "79217" (e.g., bytes) under free space category 1320.

Percentage free category 1325 may include information (e.g., percentage free space of a drive) associated with drives of any device in network 100 and/or any device provided in a network separate from network 100. For example, first record 1340 may indicate that drive "H" has a percentage free space of "12.23" (percent) under percentage free category 1325, second record 1345 may indicate that drive "L" has a percentage free space of "41.83" (percent) under percentage free category 1325, and third record 1350 may indicate that drive "J" has a percentage free space of "52.23" (percent) under percentage free category 1325.

Score category 1330 may include information (e.g., a score of a drive as generated by scoring engine 420) associated with drives of any device in network 100 and/or any device provided in a network separate from network 100. For example, first record 1340 may indicate that drive "H" has a score of "87" under score category 1330, second record 1345 may indicate that drive "L" has a score of "58" under score category 1330, and third record 1350 may indicate that drive "J" has a score of "48" under score category 1330.

Status category 1335 may include information (e.g., a visual indication of a status of a drive) associated with drives of any device in network 100 and/or any device provided in a network separate from network 100. In one implementation, the visual indication of a status of a drive may be based on the percentage free space of the drive (e.g., there may be a visual indicator for percentage free space of more than 15%, another visual indicator for percentage free space between 10% and 15%, and still another visual indicator for percentage free space of less than 10%). In other implementations, the visual indication of status may be based on other drive information, may be color based, may be shape based, etc.

Although FIG. 13 shows exemplary elements of user interface 1300, in other implementations, user interface 1300 may contain fewer, different, or additional elements than depicted in FIG. 13.

FIGS. 14-20 depict a flow chart of an exemplary process 1400 for automatically managing, monitoring, maintaining, displaying, providing statistics related to, etc. jobs, one or more networks, network devices, applications executing on the network devices etc. according to implementations described herein. In one implementation, process 1400 may be performed by dashboard server 120. In another implementation, some or all of process 1400 may be performed by another device or group of devices, including or excluding dashboard server 120.

Figure 14:
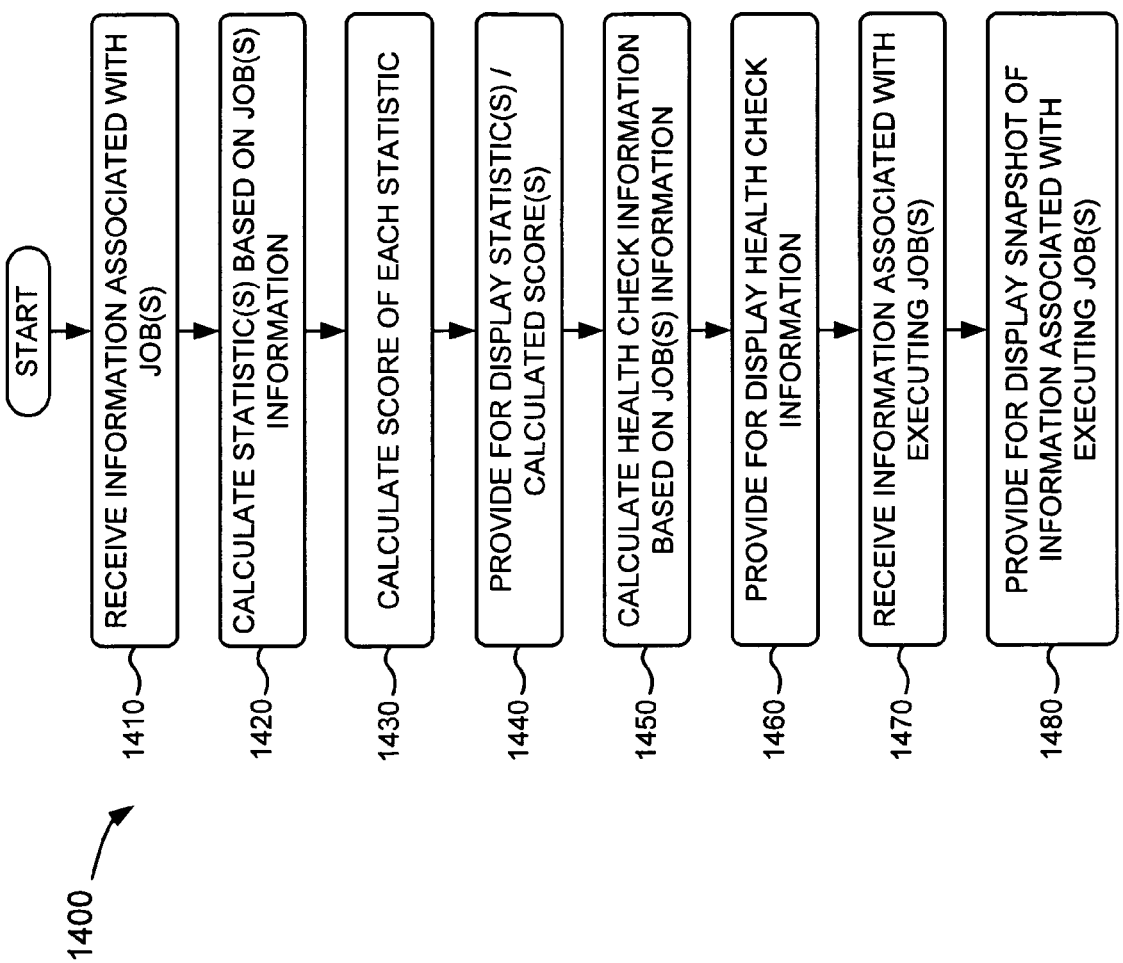
FIGS. 14-20 depict a flow chart of an exemplary process according to implementations described herein.

As illustrated in FIG. 14, process 1400 may begin with receipt of information associated with one or more jobs (block 1410), and calculating one or more statistics based on the job(s) information (block 1420). For example, in one implementation described above in connection with FIG. 3, job 340 may be received by dashboard server 120. Job status information 360 may be received by job tracking system 130, and may be provided by job tracking system 130 to dashboard server 120. Dashboard server 120 may forward job status information 360 and dashboard information 380 to user device 110 for display to a user. Dashboard server 120 may use information associated with issue 330, information associated with job 340, job status information 360, etc. to calculate and generate dashboard information 380. Dashboard information 380 may include information associated with job 340 (e.g., health reports, dashboard reports, snapshot reports, etc.), statistics (e.g., scores) related to job 340, etc.

As further shown in FIG. 14, a score may be calculated for each of the one or more statistics (block 1430), and the one or more statistics and scores may be provided for display (block 1440). For example, in implementations described above in connection with FIGS. 4 and 6, scoring engine 420 of dashboard server 120 may include any hardware and/or software based logic (e.g., processing logic 220) that enables dashboard server 120 to provide a measure (e.g., a score) for each statistic contained in scoring database 410. Scoring engine 420 may output statistic scores 460 (e.g., to user device 110). In one example, user interface 600 (e.g., a dashboard report), as shown in FIG. 6, may be displayed to the user. User interface 600 may include date selection mechanism 605, table statistics section 610, column statistics section 615, job statistics section 620, drive space statistics section 625, application status section 630, status indicators 635, applications menu 655, tools menu 660, health check menu 665, administrative menu 670, and/or login/logout mechanism 675.

Returning to FIG. 14, health check information may be calculated based on the job(s) information (block 1450), and the health check information may be provided for display (block 1460). For example, in implementations described above in connection with FIGS. 4 and 9-13, health reporter 430 of dashboard server 120 may include any hardware and/or software based logic (e.g., processing logic 220) that enables dashboard server 120 to check a status of each job (e.g., job 340) based on job logs (e.g., provided by job tracking system 130), and to generate and/or update health reports 470 for the jobs. In one example, health reporter 430 may provide health reports 470 to onsite team 310 (or a user device associated with onsite team 310), offsite team 320 (or a user device associated with offsite team 320), user device 110, etc. at specified time periods (e.g., hourly, daily, weekly, etc.). Health reports 470 may include job health check reports (as shown in FIG. 9), drive health check reports (as shown in FIG. 10), server health check reports (as shown in FIG. 11), job report health check reports (as shown in FIG. 12), and/or drive report health check reports (as shown in FIG. 13).

As further shown in FIG. 14, information associated with one or more executing jobs may be received (block 1470), and a snapshot of the information associated with the one or more executing jobs may be provided for display (block 1480). For example, in implementations described above in connection with FIGS. 4 and 8, snapshot reporter 450 of dashboard server 120 may include any hardware and/or software based logic (e.g., processing logic 220) that enables dashboard server 120 to receive statuses of jobs (e.g., job 340) currently executing, and to generate and/or update snapshot reports 490 based on the received statuses. In one implementation, snapshot reporter 450 may receive status information associated with an executing job, a start time associated with the executing job, a current duration associated with the executing job, an average duration associated with the executing job, an offset duration associated with the executing job, message information associated with the executing job, etc., and may generate (e.g., provide for display) snapshot reports 490 based on this information. In one example, as shown in FIG. 8, snapshot reports 490 may include job status category 810, job start time category 815, job current duration category 820, job average duration category 825, job offset duration category 830, job message category 835, and first record 840, second record 845, and third record 850 associated with categories 810-835.

Figure 15:
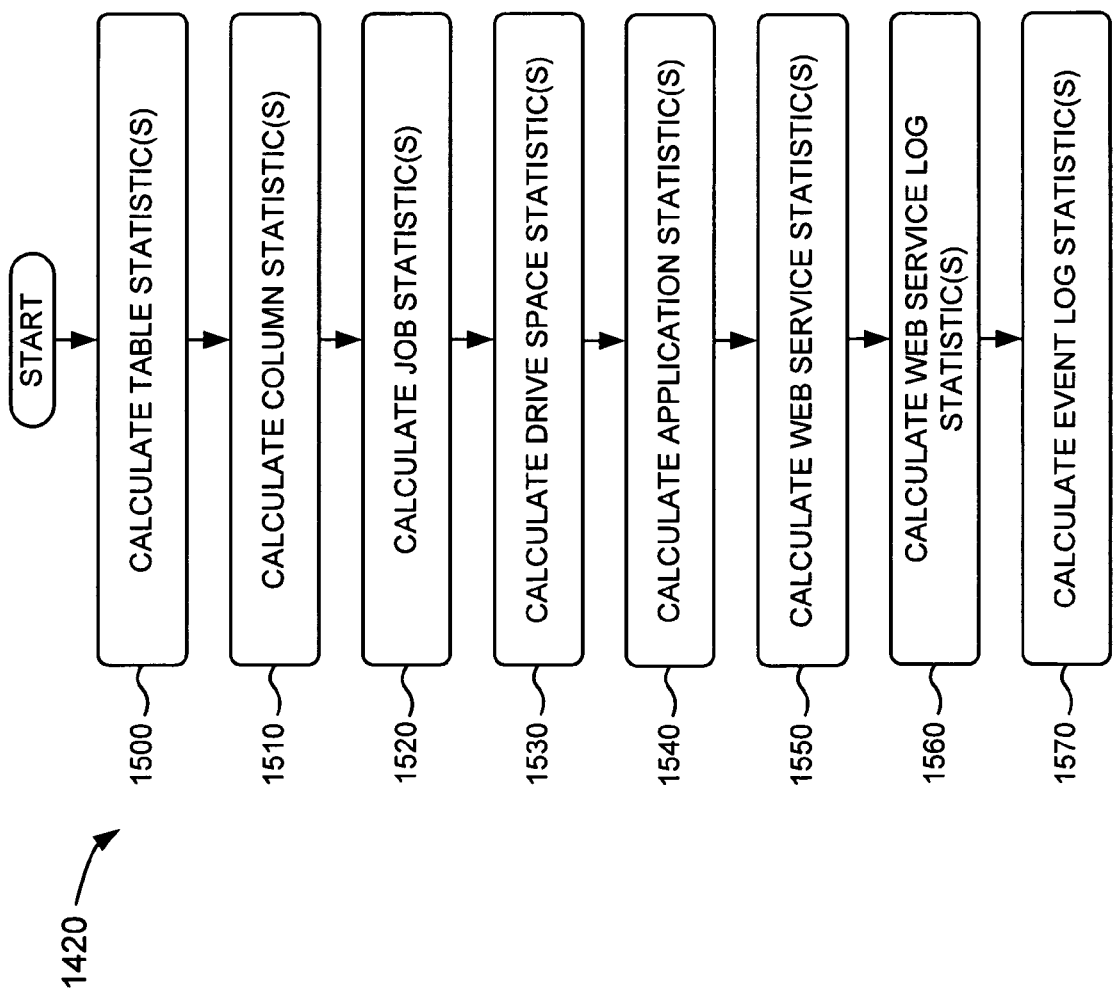

Process block 1420 may include the process blocks illustrated in FIG. 15. As shown in FIG. 15, process block 1420 may include calculating one or more table statistics (block 1500), calculating one or more column statistics (block 1510, calculating one or more job statistics (block 1520), and calculating one or more drive space statistics (block 1530). For example, in one implementation described above in connection with FIG. 1, scoring database 410 of dashboard server 120 may include a variety of information related to issues (e.g., issue 330) and/or jobs (e.g., job 340) being managed, monitored, maintained, etc. by dashboard server 120. The information contained in scoring database 410 may be calculated by dashboard server 120 based on information associated with one or more jobs. In one example, scoring database 410 may include statistical information, such as table statistics, column statistics, job statistics, and drive space statistics associated with networks, network devices, applications executing on the network devices, etc.

As further shown in FIG. 15, one or more application statistics may be calculated (block 1540), one or more web service statistics may be calculated (block 1550), one or more web service log statistics may be calculated (block 1560), and one or more event log statistics may be calculated (block 1570). For example, in one implementation described above in connection with FIG. 1, scoring database 410 of dashboard server 120 may include a variety of information related to issues (e.g., issue 330) and/or jobs (e.g., job 340) being managed, monitored, maintained, etc. by dashboard server 120. The information contained in scoring database 410 may be calculated by dashboard server 120 based on information associated with one or more jobs. In one example, scoring database 410 may include statistical information, such as application status, web service statistics, web service log statistics, event log statistics, etc. associated with networks, network devices, applications executing on the network devices, etc.

Figure 16:
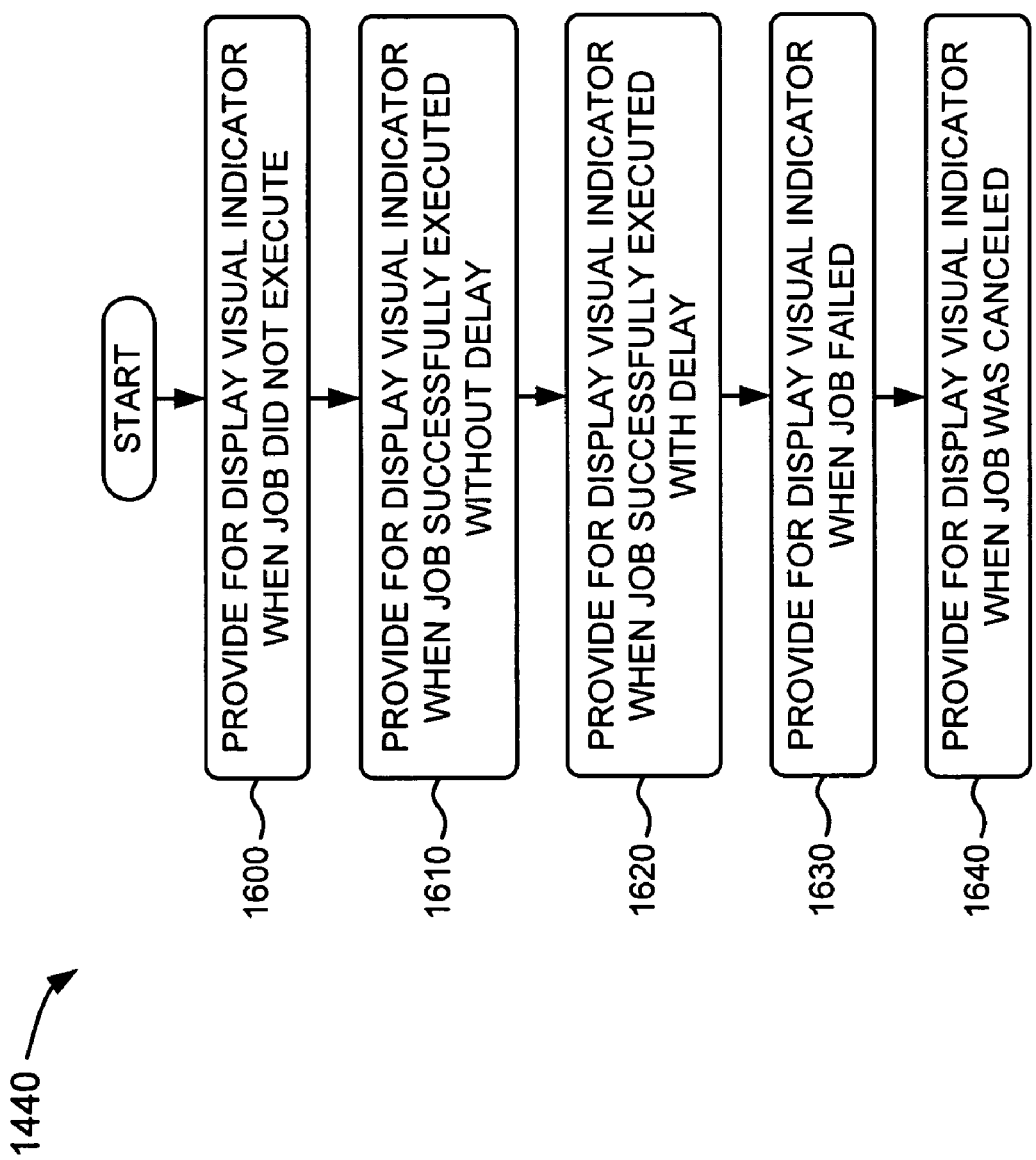

Process block 1440 may include the process blocks illustrated in FIG. 16. As shown in FIG. 16, process block 1440 may include providing for display a visual indicator when a job did not execute (block 1600), and providing for display a visual indicator when a job successfully executed without delay (block 1610). For example, in one implementation described above in connection with FIG. 7, status indicators 745-765 (e.g., of user interface 700 provided by dashboard server 120) may provide visual indications of statuses of jobs listed under job category 705. In one example, status indicators 745-765 may provide colored status indicators (e.g., red may indicate issues, yellow may indicate potential issues, and green may indicate that there are no issues), shaped status indicators (e.g., an octagon may indicate issues, a triangle may indicate potential issues, and a circle may indicate that there are no issues), image-based indicators (e.g., a stop sign may indicate issues, a yield sign may indicate potential issues, and a green light may indicate that there are no issues), and/or combinations of the aforementioned. In another example, status indicator 745 may indicate that a job (e.g., the job listed in record 720) did not execute, and status indicator 750 may indicate that a job (e.g., the job listed in record 725) executed successfully without delay.

As further shown in FIG. 16, a visual indicator may be provided for display when a job successfully executed with delay (block 1620), a visual indicator may be provided for display when a job failed (block 1630), and a visual indicator may be provided for display when a job was canceled (block 1640). For example, in one implementation described above in connection with FIG. 7, status indicators 745-765 (e.g., of user interface 700 provided by dashboard server 120) may provide visual indications of statuses of jobs listed under job category 705. In one example, status indicators 745-765 may provide colored status indicators, shaped status indicators, image-based indicators, and/or combinations of the aforementioned. In another example, status indicator 755 may indicate that a job (e.g., the job listed in record 730) executed successfully with delay, status indicator 760 may indicate that a job (e.g., the job listed in record 735) failed, and status indicator 765 may indicate that a job (e.g., the job listed in record 740) was canceled.

Figure 17:
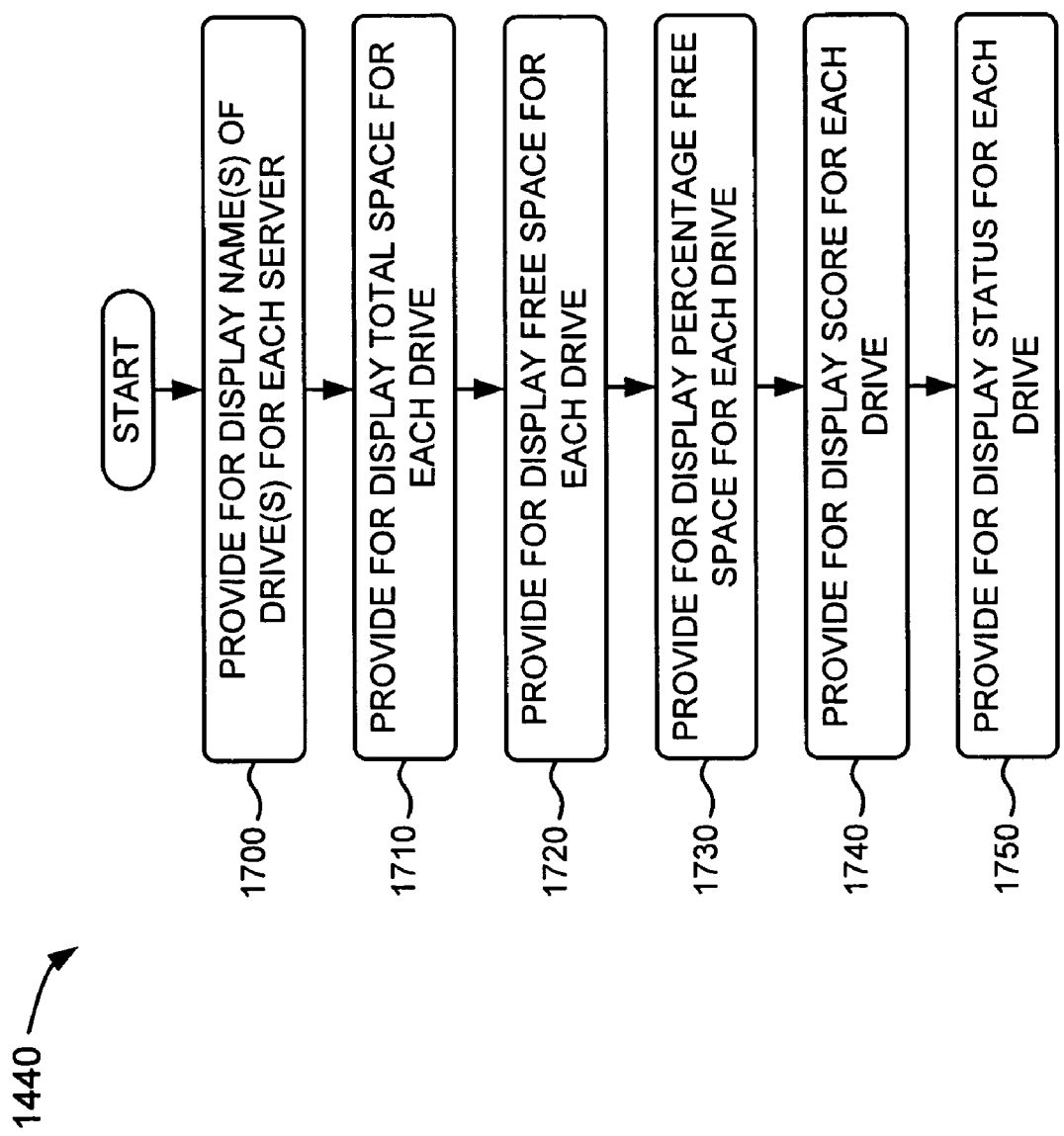

Alternatively and/or additionally, process block 1440 may include the process blocks illustrated in FIG. 17. As shown in FIG. 17, process block 1440 may include providing for display one or more names of one or more drives for each server (block 1700), providing for display a total space for each of the one or more drives (block 1710), and providing for display a free space for each of the one or more drives (block 1720). For example, in one implementation described above in connection with FIG. 13, user interface 1300 (provided by dashboard server 120) may include drive name category 1310, total space category 1315, and free space category 1320. Drive name category 1310 may include information (e.g., drive names) associated with drives of any device in network 100 and/or any device provided in a network separate from network 100. Total space category 1315 may include information (e.g., total space of a drive) associated with drives of any device in network 100 and/or any device provided in a network separate from network 100. Free space category 1320 may include information (e.g., free space of a drive) associated with drives of any device in network 100 and/or any device provided in a network separate from network 100.

As further shown in FIG. 17, a percentage free space for each of the one or more drives may be provided for display (block 1730), a score for each of the one or more drives may be provided for display (block 1740), and a status for each of the one or more drives may be provided for display (block 1750). For example, in one implementation described above in connection with FIG. 13, user interface 1300 (provided by dashboard server 120) may include percentage free category 1325, score category 1330, and status category 1335. Percentage free category 1325 may include information (e.g., percentage free space of a drive) associated with drives of any device in network 100 and/or any device provided in a network separate from network 100. Score category 1330 may include information (e.g., a score of a drive as generated by scoring engine 420) associated with drives of any device in network 100 and/or any device provided in a network separate from network 100. Status category 1335 may include information (e.g., a visual indication of a status of a drive) associated with drives of any device in network 100 and/or any device provided in a network separate from network 100.

Figure 18:
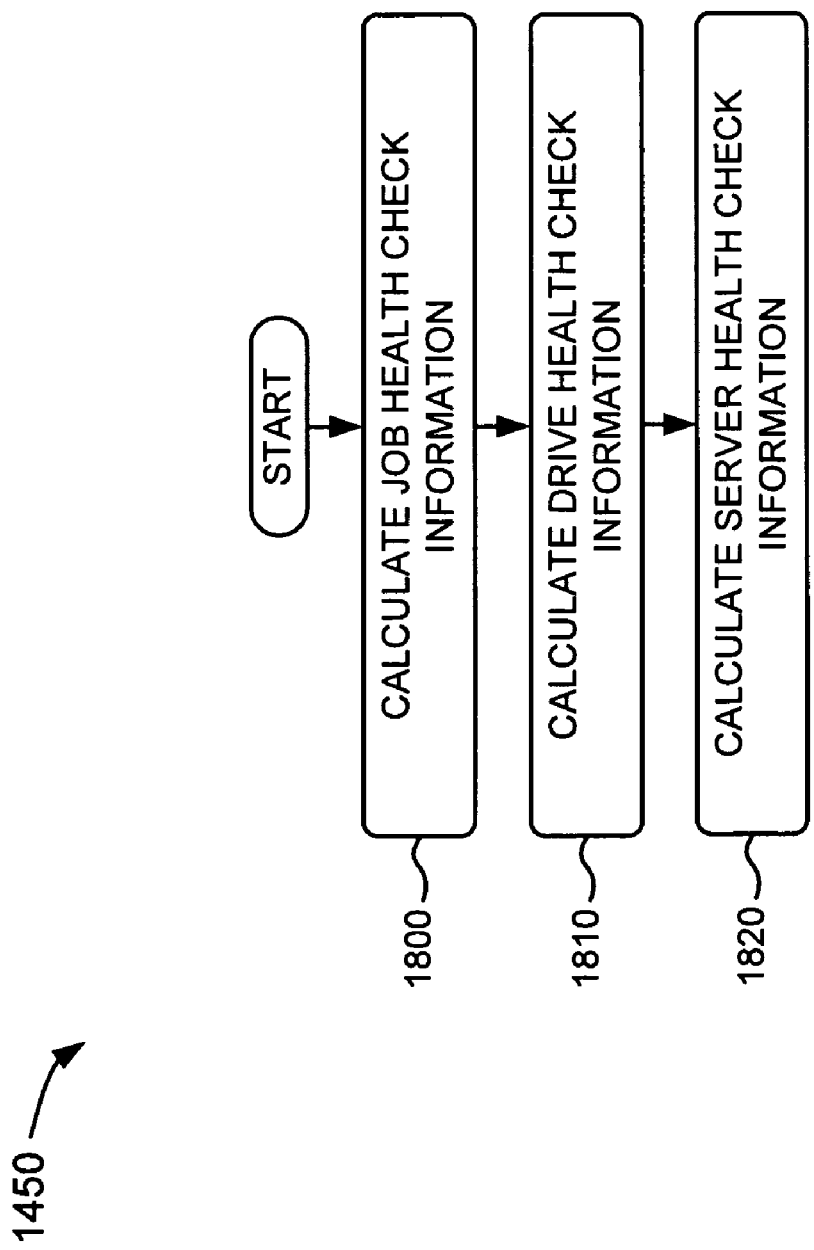

Process block 1450 may include the process blocks illustrated in FIG. 18. As shown in FIG. 18, process block 1450 may include calculating job health check information based on the job(s) information (block 1800), and calculating drive health check information based on the job(s) information (block 1810). For example, in one implementation described above in connection with FIG. 4, health reporter 430 of dashboard server 120 may include any hardware and/or software based logic (e.g., processing logic 220) that enables dashboard server 120 to check a status of each job (e.g., job 340) based on job logs (e.g., provided by job tracking system 130), and to generate and/or update health reports 470 (e.g., job health check reports and drive health check reports).

As further shown in FIG. 18, server health check information may be calculated based on the job(s) information (block 1820). For example, in one implementation described above in connection with FIG. 4, health reporter 430 of dashboard server 120 may include any hardware and/or software based logic (e.g., processing logic 220) that enables dashboard server 120 to check a status of each job (e.g., job 340) based on job logs (e.g., provided by job tracking system 130), and to generate and/or update health reports 470 (e.g., server health check reports).

Figure 19:
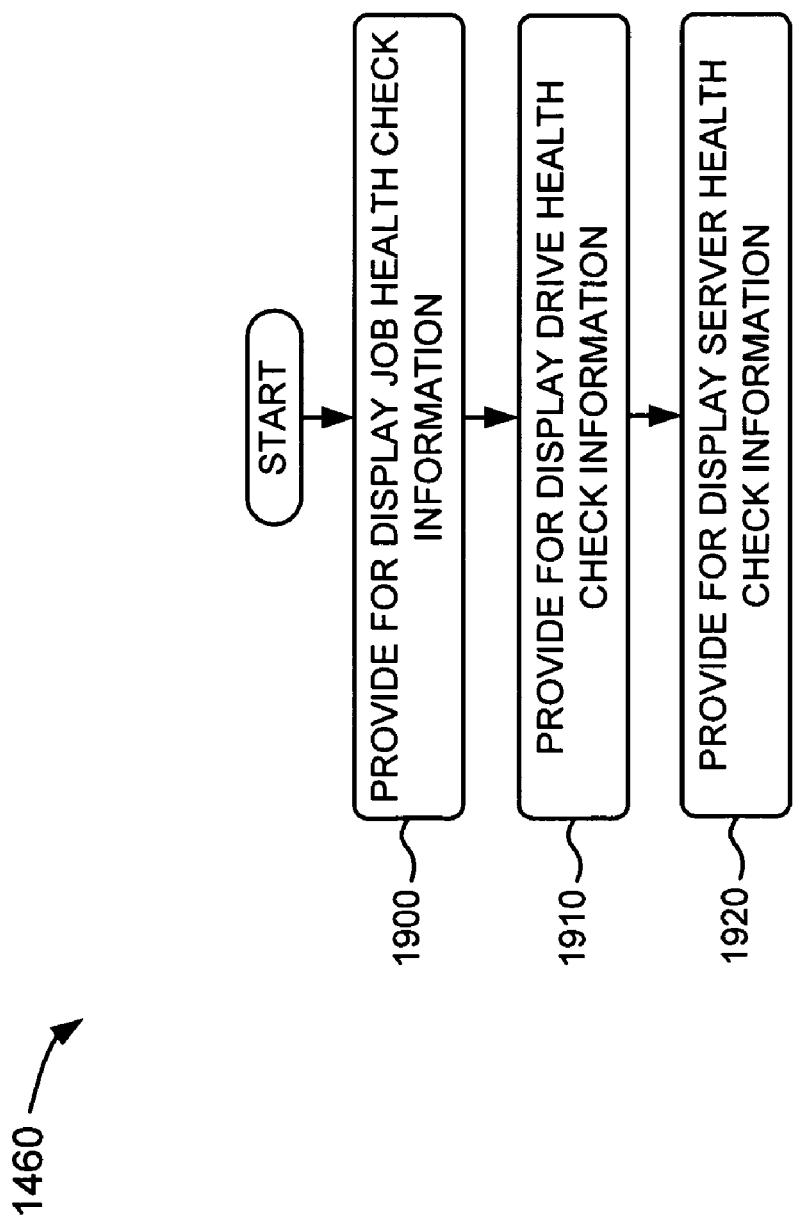

Process block 1460 may include the process blocks illustrated in FIG. 19. As shown in FIG. 19, process block 1460 may include providing for display job health check information (block 1900), and providing for display drive health check information (block 1910). For example, in implementations described above in connection with FIGS. 9, 10, 12, and 13, dashboard server 120 may provide for display (e.g., to user device 110) user interfaces 900, 1000, 1200, and 1300 that display job health check information (FIG. 9), drive health check information (FIG. 10), job report health check information (FIG. 12), and drive report health check information (FIG. 13).

As further shown in FIG. 19, server health check information may be provided for display (block 1920). For example, in one implementation described above in connection with FIG. 11, dashboard server 120 may provide for display (e.g., to user device 110) user interface 1100 that displays server health check information.

Figure 20:
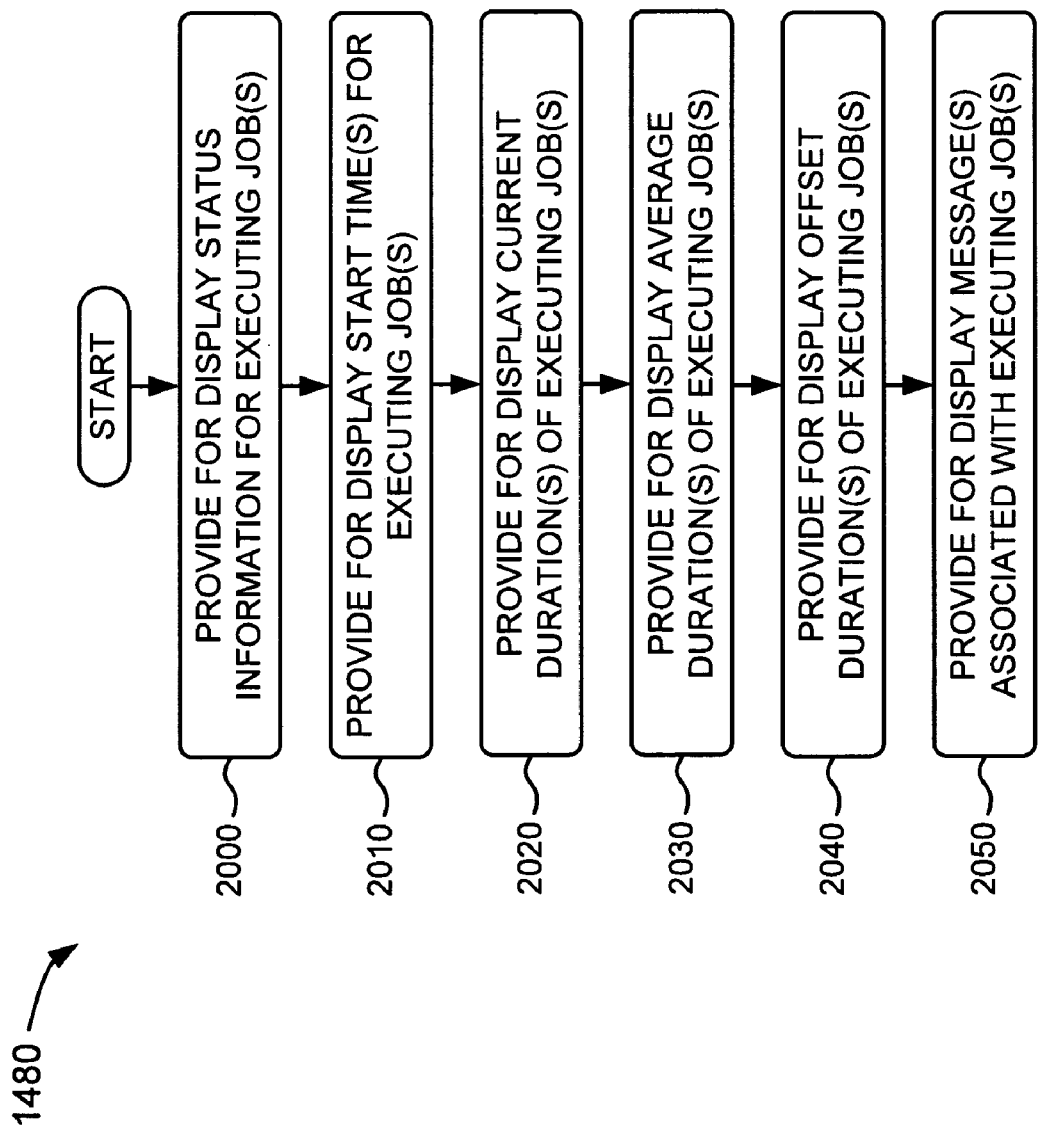

Process block 1480 may include the process blocks illustrated in FIG. 20. As shown in FIG. 20, process block 1480 may include providing for display status information for the one or more executing jobs (block 2000), providing for display one or more start times for the one or more executing (block 2010), and providing for display one or more current durations of the one or more executing jobs (block 2020). For example, in one implementation described above in connection with FIG. 8, user interface 800 (provided by dashboard server 120) may display job status category 810, job start time category 815, and job current duration category 820. Job status category 810 may include information (e.g., statuses of currently executing jobs, such as "Failed," "Succeeded," or "Canceled") associated with jobs executing on any device in network 100 and/or any device provided in a network separate from network 100. Job start time category 815 may include information (e.g., start times of currently executing jobs) associated with jobs executing on any device in network 100 and/or any device provided in a network separate from network 100. Job current duration category 820 may include information (e.g., durations of currently executing jobs) associated with jobs executing on any device in network 100 and/or any device provided in a network separate from network 100.

As further shown in FIG. 20, one or more average durations of the one or more executing jobs may be provided for display (block 2030), one or more offset durations of the one or more executing jobs may be provided for display (block 2040), and one or more messages associated with the one or more executing jobs may be provided for display (block 2050). For example, in one implementation described above in connection with FIG. 8, user interface 800 (provided by dashboard server 120) may display job average duration category 825, job offset duration category 830, and job message category 835. Job average duration category 825 may include information (e.g., average durations of currently executing jobs) associated with jobs executing on any device in network 100 and/or any device provided in a network separate from network 100. Job offset duration category 830 may include information (e.g., offset durations of currently executing jobs) associated with jobs executing on any device in network 100 and/or any device provided in a network separate from network 100. Job message category 835 may include information (e.g., messages of currently executing jobs) associated with jobs executing on any device in network 100 and/or any device provided in a network separate from network 100.

Implementations described herein may include systems and/or methods that provide a predictive monitoring dashboard application for automatically managing, monitoring, maintaining, displaying, providing statistics related to, etc. jobs, one or more networks, network devices, applications executing on the network devices etc. For example, in one implementation, the dashboard application may receive information associated with the one or more jobs, may calculate statistics based on the job(s) information, may calculate a score of each statistic, and may provide for display the statistics and the calculated scores. The dashboard application may calculate health check information based on the job(s) information, and may provide for display the health check information. Statuses of executing jobs may be received by the dashboard application, and the dashboard application may provide for display a snapshot of information associated with the executing jobs.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 14-20, the order of the acts may be modified in other implementations. Further, non-dependent acts may be performed in parallel.

Also, the term "user" has been used herein, and is intended to be broadly interpreted to include user devices 110 and/or dashboard server 120 or a user (e.g., a network administrator, a network engineer, a network technician, etc.) of user devices 110 and/or dashboard server 120.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A computing device-implemented method, comprising:
   receiving, by the computing device, information associated with a job implemented in a network;
   calculating, by the computing device, a statistic based on the information associated with the job;
   calculating, by the computing device, a statistic score for the calculated statistic, the statistic score being calculated using a weight that is based on a ratio of:
      a first value, associated with the calculated statistic for a particular time, and
      a second value associated with another statistic for the particular time, the other statistic differing from the calculated statistic, and the second value being based on a sum of values associated with the other statistic over a period of time divided by a quantity of the values associated with the other statistic over the period of time;
   calculating, by the computing device, health check information based on the information associated with the job;
   calculating, by the computing device, a status indicator based on the calculated statistic; and
   providing for display, by the computing device, the calculated statistic, the calculated statistic score, the calculated health check information, and the calculated status indicator.

2. The computing device-implemented method of claim 1, where calculating the statistic comprises one or more of:
   calculating a table statistic based on the information associated with the job;
   calculating a column statistic based on the information associated with the job;
   calculating a job statistic based on the information associated with the job;
   calculating a drive space statistic based on the information associated with the job;
   calculating an application statistic based on the information associated with the job;
   calculating a web service statistic based on the information associated with the job;
   calculating a web service log statistic based on the information associated with the job; or
   calculating an event log statistic based on the information associated with the job.

3. The computing device-implemented method of claim 1, where providing for display comprises at least one of:
   providing for display a first visual indicator when the job does not execute;
   providing for display a second visual indicator when the job executes with delay;
   providing for display a third visual indicator when the job executes without delay;
   providing for display a fourth visual indicator when the job fails to execute; or
   providing for display a fifth visual indicator when the job is canceled.

4. The computing device-implemented method of claim 1, where providing for display comprises one or more of:
   providing for display a name of a drive of a network device;
   providing for display an amount of total memory space for the drive;
   providing for display an amount of free memory space for the drive;
   providing for display a percentage of free memory space for the drive;
   providing for display a score for the drive; or
   providing for display a status for the drive.

5. The computing device-implemented method of claim 1, where calculating health check information comprises one or more of:
   calculating health check information associated with the job;
   calculating health check information associated with a drive of a network device; or
   calculating health check information associated with a server of the network.

6. The computing device-implemented method of claim 5, where providing for display comprises one or more of:
   providing for display the health check information associated with the job;
   providing for display the health check information associated with the drive of the network device; or
   providing for display the health check information associated with the server of the network.

7. The computing device-implemented method of claim 1, where providing for display comprises one or more of:
   providing for display status information for the job;
   providing for display a start time for the job;
   providing for display a current duration of the job;

providing for display an average duration of the job;
providing for display an offset duration of the job; or
providing for display a message associated with the job.

8. A device comprising:
a memory to store a plurality of instructions; and
a processor to execute instructions in the memory to:
receive information associated with a job implemented in a network,
calculate a statistic based on the information associated with the job,
calculate a statistic score for the calculated statistic, the processor, when calculating the statistic score, being further to:
determine a first value associated with the calculated statistic for a particular time,
determine a second value associated with another statistic for the particular time, the other statistic differing from the calculated statistic, and the second value being based on a sum of values associated with the other statistic over a period of time divided by a quantity of the values associated with the other statistic over the period of time,
determine a weight based on a ratio of the first value and second value, and
determine the statistic score based on the weight,
calculate health check information based on the information associated with the job,
calculate a status indicator based on the calculated statistic, and
provide for display the calculated statistic, the calculated statistic score, the calculated health check information, and the calculated status indicator.

9. The device of claim 8, where the information associated with the job comprises one or more of:
hardware information;
software information;
hardware and software information;
networking information;
issues affecting the network, one or more network devices, or one or more applications executing on the one or more network devices;
information associated with the network;
information associated with the one or more network devices; or
information associated with the one or more applications executing on the one or more network devices.

10. The device of claim 8, where the processor is further to execute instructions in the memory to:
provide a dashboard application to a user device of the network, and
provide for display the calculated statistic, the calculated statistic score, the calculated health check information, and the calculated status indicator to the user device via the dashboard application.

11. The device of claim 10, where the processor is further to execute instructions in the memory to:
provide for display a report, associated with the job, to the user device via the dashboard application.

12. The device of claim 11, where the report comprises one or more of:
table statistics,
column statistics,
job statistics,
drive space statistics,
application status information,
an applications menu,
a tools menu,
a health check menu, or
an administrative menu.

13. The device of claim 11, where the report comprises one or more of a job category providing at least one of:
a name of the job,
a job duration category providing a duration of the job, or
a job status category providing a status of the job.

14. The device of claim 11, where the report comprises one or more of:
a job category providing a name of the job, or
a job success category providing information indicating whether the job was successfully completed.

15. The device of claim 11, where the report comprises one or more of:
a drive category providing a name of a drive of a network device,
a drive success category providing information indicating whether the drive of the network device is operating properly, or
a drive comments section for receiving input information about the drive.

16. The device of claim 11, where the report comprises one or more of:
a server health check category providing a description of a health check for a server of the network, or
a server health check success category providing information indicating whether the health check was successfully completed.

17. The device of claim 8, where when calculating the statistic, the processor is to execute instructions in the memory to one or more of:
calculate a table statistic based on the information associated with the job;
calculate a column statistic based on the information associated with the job;
calculate a job statistic based on the information associated with the job;
calculate a drive space statistic based on the information associated with the job;
calculate an application statistic based on the information associated with the job;
calculate a web service statistic based on the information associated with the job;
calculate a web service log statistic based on the information associated with the job; or
calculate an event log statistic based on the information associated with the job.

18. The device of claim 8, where the processor is further to execute instructions in the memory to one or more of:
provide for display a first visual indicator when the job does not execute;
provide for display a second visual indicator when the job executes with delay;
provide for display a third visual indicator when the job executes without delay;
provide for display a fourth visual indicator when the job fails to execute; or
provide for display a fifth visual indicator when the job is canceled.

19. The device of claim 8, where the processor is further to execute instructions in the memory to one or more of:
provide for display a name of a drive of a network device;
provide for display an amount of total memory space for the drive;
provide for display an amount of free memory space for the drive;

provide for display a percentage of free memory space for the drive;
provide for display a score for the drive; or
provide for display a status for the drive.

20. The device of claim 8, where the processor is further to execute instructions in the memory to one or more of:
calculate health check information associated with the job;
calculate health check information associated with a drive of a network device; or
calculate health check information associated with a server of the network.

21. The device of claim 20, where the processor is further to execute in the memory to one or more of:
provide for display the health check information associated with the job;
provide for display the health check information associated with the drive of the network device; or
provide for display the health check information associated with the server of the network.

22. The device of claim 8, where the processor is further to execute instructions in the memory to one or more of:
provide for display status information for the job;
provide for display a start time for the job;
provide for display a current duration of the job;
provide for display an average duration of the job;
provide for display an offset duration of the job; or
provide for display a message associated with the job.

23. A non-transitory computer readable memory device to store instructions comprising:
one or more instructions which, when executed by a processor, cause the processor to:
receive information associated with a job implemented in a network;
calculate a statistic based on the information associated with the job;
calculate a statistic score for the statistic, where the statistic score is calculated using weights that are based on a ratio of:
a first value, associated with the calculated statistic for a particular time, and
a second value associated with other statistics for the particular time, the other statistics differing from the calculated statistic, and the second value being based on a sum of values associated with the other statistics over a period of time divided by a quantity of the values associated with the other statistics over the period of time
calculate health check information based on the information associated with the job; and
provide for display the calculated statistic, the calculated statistic score, the calculated health check information, and a snapshot of the information associated with the executing job.

24. The method of claim 1, where the status indicator includes a graphical icon.

25. The method of claim 24, where the graphical icon includes:
a first color when the statistic falls in a first range, and
a different second color when the statistic falls in a different second range.

26. The non-transitory computer readable memory device of claim 23, where the one or more instructions, when executed by the processor to calculate the statistic score, further cause the processor to:
determine respective value types associated with the calculated statistics and the other statistics;
differentiate, based on the respective value types, the values associated with the calculated statistics and the other statistics; and
determine the first value and the second value based on the differentiated values associated with the calculated statistics and the other statistics.

27. The non-transitory computer readable memory device of claim 23, further comprising:
one or more instructions which, when executed by the processor, cause the processor to:
obtain status information associated with one or more devices in the network;
identify, based the status information, one or more issues associated with the one or more devices;
receive, based on the one or more issues, information the associated with job;
identify a person to perform the job; and
forward, to a device associated with the person, the information associated with the job.

* * * * *